(12) United States Patent
Nguyen et al.

(10) Patent No.: US 11,050,887 B2
(45) Date of Patent: Jun. 29, 2021

(54) USER TERMINAL DEVICE FOR PROVIDING CALL CONTROL AND CONTROL METHOD THEREFOR

(71) Applicant: Samsung Electronics Co., Ltd., Suwon-si (KR)

(72) Inventors: Thi Luong Nguyen, Ha Noi (VN); Quang Long Nguyen, Hai Duong Province (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/628,468

(22) PCT Filed: Aug. 2, 2018

(86) PCT No.: PCT/KR2018/008807
§ 371 (c)(1),
(2) Date: Jan. 3, 2020

(87) PCT Pub. No.: WO2019/045295
PCT Pub. Date: Mar. 7, 2019

(65) Prior Publication Data
US 2020/0128132 A1    Apr. 23, 2020

(30) Foreign Application Priority Data

Aug. 31, 2017 (KR) .................. 10-2017-0111384

(51) Int. Cl.
*H04M 7/00* (2006.01)
*H04M 15/00* (2006.01)
(Continued)

(52) U.S. Cl.
CPC ....... *H04M 7/006* (2013.01); *H04M 1/72469* (2021.01); *H04M 15/56* (2013.01); *H04L 65/1006* (2013.01); *H04L 65/1069* (2013.01)

(58) Field of Classification Search
CPC .. H04M 7/006; H04M 1/72469; H04M 15/56; H04L 65/1006; H04L 65/1069
(Continued)

(56) References Cited

U.S. PATENT DOCUMENTS 7,254,137 B2    8/2007 Civanlar et al.
7,379,436 B2    5/2008 Jiang
(Continued)

FOREIGN PATENT DOCUMENTS

JP    2012-239215 A    12/2012
KR    10-2011-0003462 A    1/2011
(Continued)

*Primary Examiner* — Binh Kien Tieu
(74) *Attorney, Agent, or Firm* — Jefferson IP Law, LLP

(57) ABSTRACT

Disclosed are a user terminal device for providing a call control and a control method therefor. A user terminal device according to the present invention comprises: a display; a first communication unit for communication with a first external device; a second communication unit for communication with a second external device; and a processor for: transmitting a call request received from the first external device to the second external device through the second communication unit; transmitting a response to the call request, which has been received from the second external device, to the first external device through the first communication unit; controlling the display to display a call user interface (UI), on the basis of the response to the call request; and when call data is received from the first external device, converting the call data into Internet protocol (IP) data and transmitting the converted IP data to the second external device through the second communication unit. Accordingly, the user terminal device can retransmit a cellular network-based call received thereby to an external device connected to the Internet with the same VoIP account as that of the user terminal device, and make a phone call, so as to reduce a call charge.

19 Claims, 14 Drawing Sheets

(51) Int. Cl.
*H04M 1/72469* (2021.01)
*H04L 29/06* (2006.01)

(58) Field of Classification Search
USPC .......................................................... 370/352
See application file for complete search history.

(56) References Cited

U.S. PATENT DOCUMENTS

| | | | |
|---|---|---|---|
| 7,460,521 B2 * | 12/2008 | Son | H04L 29/06027 |
| | | | 370/352 |
| 7,856,009 B2 | 12/2010 | Azuma | |
| 8,538,004 B2 | 9/2013 | East et al. | |
| 8,897,737 B2 | 11/2014 | Hahn et al. | |
| 8,928,724 B2 * | 1/2015 | Jafry | H04M 1/67 |
| | | | 348/14.03 |
| 9,270,799 B2 | 2/2016 | Yuen et al. | |
| 9,935,787 B2 | 4/2018 | Bruner et al. | |
| 10,257,159 B2 * | 4/2019 | Kim | H04L 61/2528 |
| 10,498,866 B2 * | 12/2019 | Mao | H04L 69/08 |
| 2002/0051463 A1 * | 5/2002 | Higuchi | H04M 7/1225 |
| | | | 370/466 |
| 2003/0048795 A1 | 3/2003 | Pinault | |
| 2004/0145604 A1 * | 7/2004 | Min | H04L 29/1216 |
| | | | 715/733 |
| 2007/0167167 A1 | 7/2007 | Jiang | |
| 2008/0137643 A1 * | 6/2008 | Khanchandani | H04M 7/003 |
| | | | 370/352 |
| 2009/0129371 A1 | 5/2009 | Bishay | |
| 2009/0174558 A1 * | 7/2009 | White | G01C 3/08 |
| | | | 340/573.1 |
| 2009/0225736 A1 | 9/2009 | Patarkazishvili | |
| 2011/0275367 A1 | 11/2011 | Citron et al. | |
| 2015/0188727 A1 | 7/2015 | Bruner et al. | |
| 2015/0350339 A1 | 12/2015 | Lee et al. | |
| 2015/0373173 A1 * | 12/2015 | Taher | H04M 1/72519 |
| | | | 370/328 |
| 2016/0014164 A1 * | 1/2016 | Kashimba | H04W 76/10 |
| | | | 370/352 |
| 2016/0095017 A1 | 3/2016 | Ely et al. | |
| 2016/0150355 A1 | 5/2016 | Yoo et al. | |
| 2016/0164883 A1 * | 6/2016 | Li | H04L 63/0853 |
| | | | 726/7 |
| 2016/0205709 A1 | 7/2016 | Lim et al. | |
| 2016/0234348 A1 * | 8/2016 | Mao | H04L 69/08 |
| 2018/0063859 A1 * | 3/2018 | Anantharaman | H04L 67/04 |

FOREIGN PATENT DOCUMENTS

| | | |
|---|---|---|
| KR | 10-1521680 B1 | 5/2015 |
| KR | 10-2016-0102194 A | 8/2016 |
| WO | 2006/094564 A1 | 9/2006 |
| WO | 2016/101035 A1 | 6/2016 |

* cited by examiner

USER TERMINAL DEVICE FOR PROVIDING CALL CONTROL AND CONTROL METHOD THEREFOR

TECHNICAL FIELD

The disclosure relates to a user terminal device for providing a call control and a control method therefor, and more particularly, to a user terminal device for providing call control by retransmitting a call to a plurality of external devices used by a user and a control method therefor.

BACKGROUND ART

On cellular networks, a voice call between a caller and a callee is provided through a private branch exchange (PBX) provided by a cellular provider. In addition, companies use their own PBXs, which are separate from the PBXs provided by cellular providers, by establishing their own internal extensions.

In general, when all the terminals performing the telephone call are on the cellular network, the PBX provided by the cellular provider may retransmit the telephone call between the terminals. In addition, when all the terminals performing the telephone call are on Voice over Internet Protocol (VoIP), the PBX may retransmit the VoIP call between the terminals.

In general, a method of switching the call between the terminals of the user may be limited to a distance between the terminals. In this case, in the method of switching the call between the terminals of the user, the call is performed in one terminal and the call is released in the other terminal.

In addition, when the user receives an international call from abroad using a terminal used in local country, the user uses a roaming service provided by the cellular provider. Therefore, if a caller in a local country does not know a VoIP application account of a user in abroad, the user must pay a high call charge by making a telephone call through the roaming service.

DISCLOSURE

Technical Problem

The disclosure provides a user terminal device for providing a call control to maintain a call by retransmitting a call received by the user terminal device to an external device, and a control method therefor.

Technical Solution

According to an embodiment of the disclosure, a user terminal device includes: a display; a first communicator configured to communicate with a first external device; a second communicator configured to communicate with a second external device; and a processor configured to: determine whether a call request is transmitted to the second external device when the call request is received from the first external device, and transmit the received call request to the second external device through the second communicator when the call request is transmitted, transmit a response for the call request received from the second external device to the first external device through the first communicator, and convert call data into Internet Protocol (IP) data when the call data is received from the first external device, and transmit the converted IP data to the second external device through the second communicator.

The processor may be configured to control the display to display a call user interface (UI) based on the response for the call request, and the processor may be configured to control the display to display a first call UI corresponding to the call request, and change and display the first call UI to a second call UI while a call with the first external device is maintained based on the response.

The processor may be configured to control the display to change and display the second call UI to correspond to a third call UI displayed on the display of the second external device based on the response, and the third call UI may correspond to a Voice over Internet Protocol (VoIP) call.

The first call UI may include a first icon indicating network communication corresponding to the call request, the second call UI may include the first icon and a second icon indicating the VoIP call, and the third call UI may include the second icon.

The user terminal device may further include a microphone; and a speaker, wherein the processor is configured to control the microphone and the speaker to be disabled when the response for the call request is received from the second external device.

The same VoIP application as that being executing in the user terminal device may be executing in the second external device, and the second external device may have the same account of the VoIP application which is executing, as the user terminal device, and the processor may be configured to: determine whether the call request is transmitted to the second external device according to whether the VoIP application is executed, and transmit a call response for a phone call between the first external device and the user terminal device to the first external device through the first communicator, when the VoIP application is not executed.

The number of second external devices may be plural, and the processor may be configured to: transmit the call request to the plurality of second external devices through the second communicator, convert the call data received from the first external device into the IP data when a response for the call request is received from the plurality of second external devices, and transmit the IP data to the plurality of second external devices through the second communicator.

The processor may be configured to: terminate a phone call by transmitting a call termination request to the second external device through the second communicator when the call termination request is received from the first external device, and terminate the phone call by transmitting a call termination request to the first external device through the first communicator when the call termination request is received from the second external device.

The processor may be configured to: convert received IP data into call data when the IP data for phone call with the first external device is received from the second external device, and transmit the converted call data to the first external device through the first communicator.

The first communicator may transmit and receive call data for phone call with the first external device through a cellular network, and the second communicator may transmit and receive IP data for the phone call with the second external device using an external server through a Voice over Internet Protocol (VoIP) network.

According to another embodiment of the disclosure, a control method of a user terminal device includes: receiving a call request from a first external device through a first communicator; determining whether the call request is transmitted to a second external device; transmitting the call request to the second external device through a second communicator when the call request is transmitted; transmitting a response for the call request to the first external device through the first communicator when the response for the call request is received from the second external device through the second communicator; converting call data into Internet Protocol (IP) data when the call data is received from the first external device through the first communicator; and transmitting the IP data to the second external device through the second communicator.

The control method may further include displaying a call user interface (UI), wherein the displaying of the call UI includes: displaying a first call UI corresponding to the call request; and changing and displaying the first call UI to a second call UI while a call with the first external device is maintained based on the response for the call request.

In the changing and displaying of the first call UI to the second call UI, the second call UI may be changed and displayed to correspond to a third call UI displayed on a display of the second external device based on the response for the call request, and the third call UI may correspond to a Voice over Internet Protocol (VoIP) call.

The first call UI may include a first icon indicating network communication corresponding to the call request, the second call UI may include the first icon and a second icon indicating the VoIP call, and the third call UI may include the second icon.

The control method may further include disabling a microphone and a speaker of the user terminal device when the response for the call request is received.

The same VoIP application as that being executing in the user terminal device may be executing in the second external device, and the second external device may have the same account of the VoIP application which is executing, as the user terminal device, and in the transmitting of the call request to the second external device, when the number of second external devices is plural, the call request may be transmitted to the plurality of second external devices, and in the converting of the call data into the IP data, when a response for the call request is received from the plurality of second external devices, the call data received from the first external device may be converted into the IP data and the IP data may be transmitted to the plurality of second external devices.

The control method may further include: receiving a call termination request from the first external device through the first communicator and terminating a phone call by transmitting the call termination request to the second external device through the second communicator.

The control method may further include: receiving a call termination request from the second external device through the second communicator and terminating a phone call by transmitting the call termination request to the first external device through the first communicator.

The first communicator may transmit and receive call data for phone communication with the first external device through a cellular network, and the second communicator may transmit and receive IP data for the phone communication with the second external device using an external server through a Voice over Internet Protocol (VoIP) network.

According to still another embodiment of the disclosure, a computer program product comprising a computer recording medium storing a computer program executable by a user terminal device including a first communicator and a second communicator different from the first communicator, wherein the computer program performs operations of: determining whether a call request is transmitted to a second external device when the call request is received from a first external device through the first communicator; transmitting the call request to the second external device through the second communicator when the call request is transmitted; transmitting a response for the call request to the first external device through the first communicator when the response for the call request is received from the second external device through the second communicator; converting call data into Internet Protocol (IP) data when the call data is received from the first external device through the first communicator; and transmitting the IP data to the second external device through the second communicator.

Advantageous Effects

As described above, according to the diverse embodiments of the disclosure, the user terminal device may retransmit the cellular network-based call received by the user terminal device to an external device which has the same VoIP account as the user terminal device and is connected to the Internet, thereby making it possible to save the call charge.

In addition, according to the diverse embodiments of the disclosure, the user terminal device may retransmit the cellular network-based call to a plurality of external devices which have the same VoIP account as the user terminal device and are connected to the Internet, thereby making it possible to perform the conference call.

In addition, according to the diverse embodiments of the disclosure, the user terminal device may retransmit the cellular network-based call to an external device which has the same VoIP account as the user terminal device and is connected to the Internet in an area in which the cellular network signal is weak, thereby making it possible to continue the call seamlessly.

In addition, according to the diverse embodiments of the disclosure, the user may retransmit the call received from the user terminal device to another user terminal device without being limited to the distance between the plurality of user terminal devices used by the user.

In addition, according to the diverse embodiments of the disclosure, the user terminal device may be implemented in an existing user terminal device capable of internet communication without additional configuration of separate hardware, thereby reducing the manufacturing cost of the user terminal device.

BEST MODE

Figure 1:
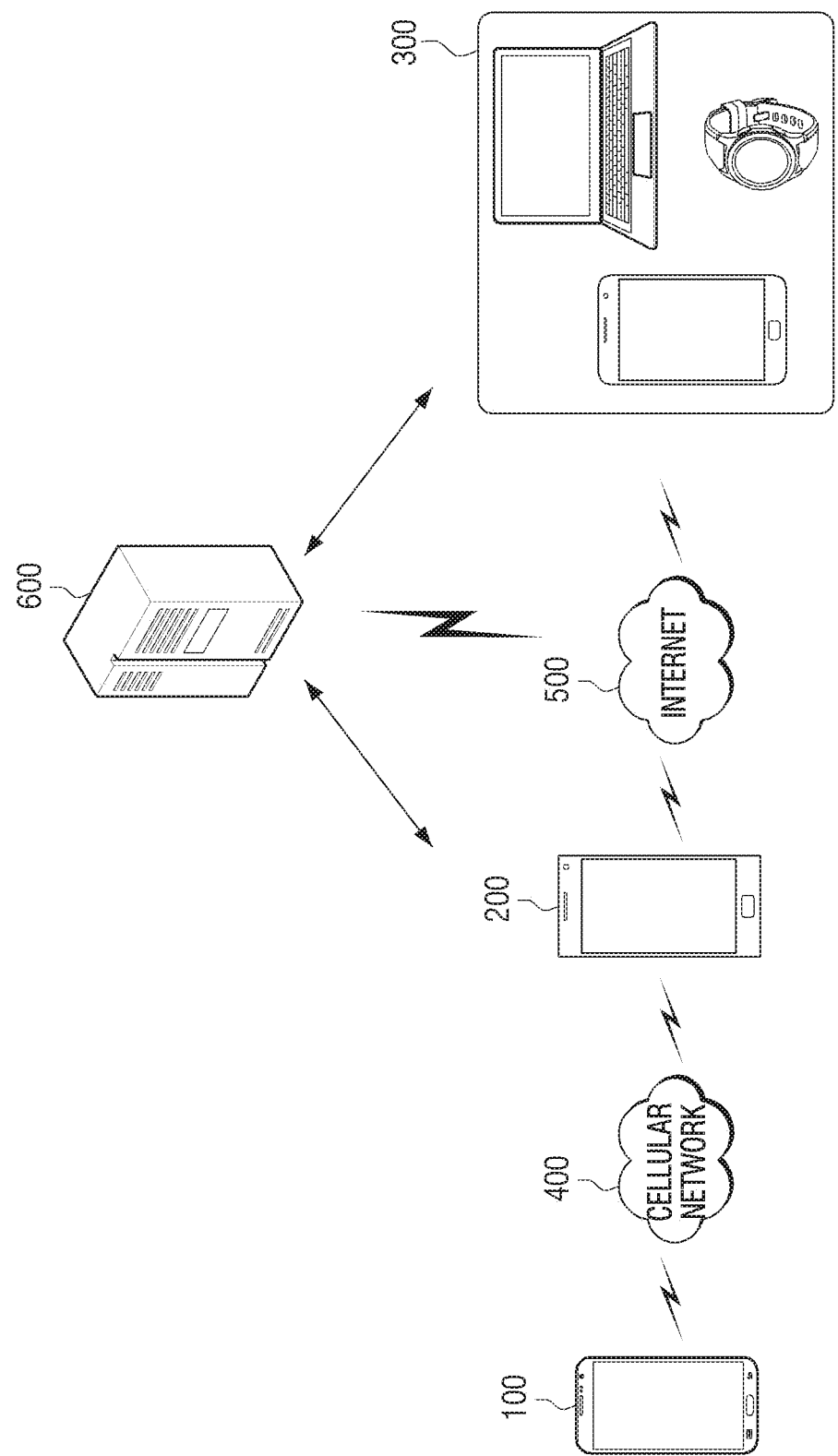
FIG. 1 is a diagram of a system for providing a call control according to an embodiment of the disclosure.

Hereinafter, embodiments of the disclosure will be described in detail with reference to the contents mentioned in the accompanying drawings. In addition, a method for manufacturing and using the disclosure will be described in detail with reference to the contents mentioned in the accompanying drawings. Like reference numerals or signs in the drawings denote parts or components that perform substantially the same function.

Terms such as first and second may be used to describe various components, but the components should not be limited by the terms. The terms are used only to distinguish one component from another component.

The term 'and/or' includes any combination of a plurality of related items or any of a plurality of related items.

The terms used herein are used to describe embodiments and are not intended to be limiting and/or restricting of the disclosure. Singular expressions include plural expressions unless the context clearly indicates otherwise.

It should be further understood that terms "include" or "have" used in the specification specify the presence of features, numerals, steps, operations, components, parts mentioned in the specification, or combinations thereof, but do not preclude the presence or addition of one or more other features, numerals, steps, operations, components, parts, or combinations thereof. Like reference numerals in the drawings denote members that perform substantially the same function.

FIG. 1 is a diagram of a system for providing a call control according to an embodiment of the disclosure.

As illustrated in FIG. 1, a system 10 includes a first external device 100, a user terminal device 200, a second external device 300, a cellular network 400, an Internet 500, and an external server 600.

The first external device 100 may be a caller capable of making a call to the user terminal device 200 through the cellular network 400. For example, the first external device 100 may include, but is not limited to, a smartphone, a tablet PC, a smart watch, a smart glass, a cellular phone, an analog phone, and the like.

The user terminal device 200 may be a callee capable of making a cellular network 400-based phone call with the first external device 100. In addition, the user terminal device 200 may make a Voice over Internet Protocol (VoIP) call with the second external device 300 through the Internet 500. For example, the user terminal device 200 may include, but is not limited to, a smartphone, a tablet PC, a wearable device, a cellular phone, and the like.

The second external device 300 may include, but is not limited to, a desktop PC, a laptop computer, a tablet PC, a smartphone, a wearable device, a cellular phone, and the like, capable of making a VoIP call with the user terminal device 200. For example, the second external device 300 may be devices that provide VoIP communication through an internet network without providing a telephone call through a cellular network.

The user terminal device 200 and the second external device 300 may be in a state of being connected to the Internet 500 through a wired or wireless network while having the same VoIP account for the same VoIP application.

The cellular network 400 may include, but is not limited to, 2G, 3G, 4G, and Long Term Evolution (LTE) provided by cellular providers.

The internet 500 may include various wired and wireless local area networks (LANs) and may include a wireless network provided through the cellular network 400. For example, the wired and wireless LANs may include public networks such as home networks, work networks, parks, and cafes.

The external server 600 may transmit and receive Internet data with the user terminal device 200 and the second external device 300 through the Internet 500. For example, the internet data may include Internet Protocol (IP) packet data for VoIP calls. The external server 600 may be a provider server that provides VoIP applications to user terminals providing VoIP services and controls VoIP calls of respective users based on VoIP accounts of the users. The external server 600 may manage and control data related to VoIP applications provided from a plurality of providers. The external server 600 may be a manufacturer server of the terminal and may be a cellular network based cellular provider.

In the system 10 according to an embodiment of the disclosure, a call may be established between the first external device 100, the user terminal device 200, and the second external device 300 by call retransmission of the user terminal device 200.

For example, the first external device 100 may request a call through the cellular network 400 to a telephone number of a user "B" of the user terminal device 200. If a call request is received from the first external device 100 while the VoIP application is running in the user terminal device 200, the user terminal device 200 may request the external server 600 to transmit the call request to the second external device 300 having the same VoIP account as that of the user "B". The user terminal device 200 may request a VoIP call to the external server 600 through the Internet 500.

The external server 600 identifies at least one second external device 300 having the same VoIP account as that of the user "B" accessing the external server 600 through the Internet 500, and may request the VoIP call to at least one identified second external device 300.

At least one second external device 300 that receives the VoIP call request from the external server 600 may answer the phone by responding to the VoIP call request. The external server 600 may transmit a response to the VoIP call request received from at least one second external device 300 to the user terminal device 200 through the Internet 500.

When the user terminal device 200 receives the response to the VoIP call request from the external server 600, the user terminal device 200 may transmit a response to the call request of the first external device 100 through the cellular network 400. Therefore, the first external device 100 may establish a cellular network-based call with the user terminal device 200, and the user terminal device 200 may establish an internet-based call (e.g., a VoIP call) with the second external device 300.

After the call is established, when the user terminal device 200 receives voice data from the first external device 100, the user terminal device 200 may control an audio input/output of the user terminal device 200 to be disabled, convert the received call data into IP data, and transmit the converted IP data to the second external device 300 through the external server 600. In addition, when the user terminal device 200 receives the VoIP call data (IP data) received through the external server 600 from the second external device 300, the user terminal device 200 may control the audio input/output of the user terminal device 200 to be disabled, convert the received VoIP call data into call data, and transmit the converted call data to the first external device 100.

Accordingly, the user terminal device 200 may serve as a call gateway between the first external device 100 and the second external device 300. A control method of the user terminal device 200 after call establishment according to embodiments of the disclosure will be described later.

Figure 2:
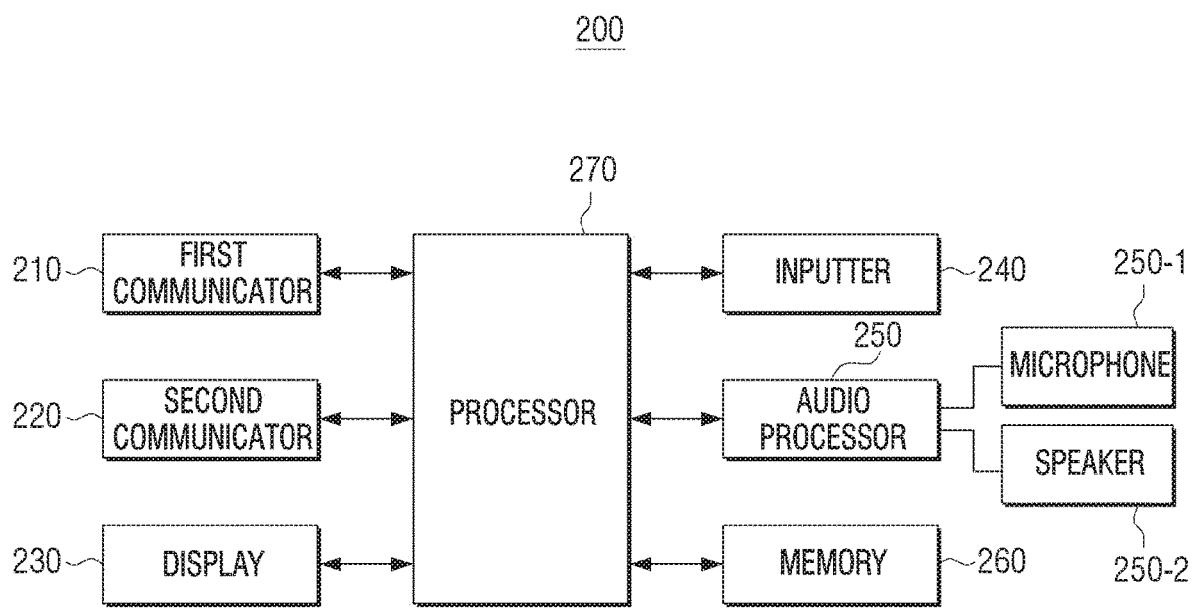
FIG. 2 is a block diagram schematically illustrating a user terminal device according to an embodiment of the disclosure.

FIG. 2 is a block diagram schematically illustrating a user terminal device according to an embodiment of the disclosure.

As illustrated in FIG. 2, the user terminal device 200 includes a first communicator 210, a second communicator 220, a display 230, an inputter 240, an audio processor 250, a memory 260, and a processor 270. The audio processor 250 may control a microphone 250-1 and a speaker 250-2.

The first communicator 210 may transmit and receive data for a cellular network-based phone call with external devices. The cellular network-based phone call may include circuit switched voice calls and packet switched data operations. For example, the first communicator 210 may provide at least one cellular network communication of 2G, 3G, and 4G, but is not limited thereto. The first communicator 210 may include a SIM card slot (not illustrated) and an antenna (not illustrated) for cellular network-based phone call.

The first communicator 210 may receive a call request from the first external device 100, which is the caller. After the call is established between the first external device 100 and the user terminal device 200, the first communicator 210 may receive the call data from the first external device 100. The number of the first external devices 100 may be plural. The call data may include at least one of voice data or video data.

The second communicator 220 may communicate with an external server and external devices using 3G, 4G, LTE, various types of local area networks (LANs), wireless local area networks (WLANs), and the like, but is not limited thereto. The second communicator 220 may transmit and receive internet data with the second external device 300 through the external server on the VoIP network. The second communicator 220 may transmit and receive the internet data with a plurality of second external devices 300 having the same VoIP account as the user terminal device 200. For example, the VoIP account may be a session initiation protocol (SIP) account for VoIP call using an application that provides VoIP calls.

The display 230 may output various user interfaces and data. The display 230 may include a touch screen. The display 230 may include a flexible display. The display 230 may be implemented in various hardware configurations.

The inputter 240 may receive various inputs from a user of the user terminal device 200. For example, the inputter 240 may receive a user command such as a voice input or a touch input, but is not limited thereto.

The audio processor 250 may control voice input and output of the microphone 250-1 and the speaker 250-2. The microphone 250-1 may receive a user voice for a phone call, and the speaker 250-2 may output voice for a phone call received from external devices.

The memory 260 may store various data related to an operation performed by the user terminal device 200. The memory 260 may store various programs and applications performed by the user terminal device 200.

The processor 270 may execute the programs stored in the memory 260. The processor 270 may execute various applications in the user terminal device 200. For example, the applications may include a web browser connected to the Internet through the second communicator 220. The applications may be downloaded through the external server through the second communicator 220 and executed in the user terminal device 200. The applications may be application capable of accessing the external server through the second communicator 220 and being executed on the external server. The application may include a VoIP application.

When the processor 270 receives the call request from the first external device 100 through the first communicator 210, the processor 270 determines whether the call request may be transmitted to the second external device 300. As a result of the determination, if the call request may be transmitted, the processor 270 may transmit the received call request to the second external device 300 through the second communicator 220. For example, the first external device 100 and the second external device 300 may include the same hardware configuration as the user terminal device 200. The first external device 100 may not include a hardware configuration for providing Internet communication. The second external device 300 may not include a hardware configuration for providing a cellular network communication-based phone call.

When the processor 270 receives the response to the call request from the second external device 300, the processor 270 may transmit the call response received through the first communicator 210 to the first external device 100. When the processor 270 receives an acknowledge message regarding the call response from the first external device 100 through the first communicator 210, the processor 270 may establish a cellular call between the user terminal device 200 and the first external device 100 and may establish a VoIP call between the user terminal device 200 and the second external device 300.

The processor 270 may control the display 230 to display a call user interface (UI) based on the call response of the second external device 300 received from the second communicator 220. For example, the call response of the second external device 300 may be that the user picks up a call received from the second external device 300. The owner of the user terminal device 200 and the second external device 300 may be the same.

When the processor 270 receives call data for a phone call from the first external device 100 through the first communicator 210, the processor 270 may convert the call data into Internet Protocol (IP) data. The processor 270 may transmit the converted IP data to the second external device 300 through the second communicator 220. For example, the call data may include voice data.

When the processor 270 receives the call request from the first external device 100, the processor 270 may display a first call user interface (UI) corresponding to the call request, and may control the display 230 to change the first call UI to a second call UI and display the second call UI while the call with the first external device 100 is maintained based on the call response from the second external device 300. For example, the first call UI may correspond to a cellular call using a cellular network such as 2G, 3G, or 4G.

The processor 270 may control the display 230 to change and display the second call UI to correspond to a third call UI displayed on the display of the second external device 300 based on the call response from the second external device 300. For example, the third call UI may correspond to a Voice over Internet Protocol (VoIP) call. Therefore, the second call UI may correspond to the VoIP call.

For example, the first call UI may include a first icon representing a network communication corresponding to the call request of the second external device 300, the second call UI may include the first icon and a second icon representing a VoIP call, and the third call UI may include the second icon.

For example, the first icon may be an icon representing a cellular network-based phone call, and the second icon may be an icon provided by an application for providing the VoIP call. The second icon may be provided through the external server.

In the second external device 300, the same VoIP application as that being executed in the user terminal device 200 is being executed, and the second external device 300 may have the same VoIP account as the user terminal device 200.

Therefore, the processor 270 determines whether the same VoIP application as that being executed in the second external device 300 is being executed, and when the same VoIP application is executed, the processor 270 may transmit the call request received from the first external device 100 to the second external device 300 through the second communicator 220.

Meanwhile, when it is determined that the same VoIP application as that being executed in the second external device 300 is not executed, the processor 270 may transmit the call response for a phone call between the first external device 100 and the user terminal device 200 to the first external device 100 through the first communicator 210.

Meanwhile, when the processor 270 receives the response to the call request from the second external device 300, the processor 270 may control the audio processor 250 to disable the microphone 250-1 and the speaker 250-2.

The number of the second external devices 300 may be plural. In this case, the processor 270 may transmit the call request signal received from the first external device 100 through the first communicator to the plurality of second external devices 300 through the second communicator 220. In addition, when the processor 270 receives a response to the call request from the plurality of second external devices 300 through the second communicator, the processor 270 may convert the call data received from the first external device 100 into Internet Protocol (IP) data, and transmit the converted IP data to the plurality of second external devices 300 through the second communicator 220. Accordingly, the user terminal device 200 may operate as a gateway for performing a conference call between the first external device 100 and the plurality of second external devices 300.

When the processor 270 receives a call termination request from the first external device 100, the processor 270 may transmit a call termination message to the second external device 300 through the second communicator 220 to terminate the VoIP phone call between the user terminal device 200 and the second external device 300. In this case, the cellular network based call between the first external device 100 and the user terminal device 200 is also terminated.

When the processor 270 receives the call termination message from the second external device 300, the processor 270 may transmit the call termination message to the first external device 100 through the first communicator 210 to terminate the cellular network based call between the user terminal device 200 and the first external device 100. In this case, the VoIP phone call between the user terminal device 200 and the second external device 300 is also terminated.

When the processor 270 receives IP data for a phone call with the first external device 100 from the second external device 300, the processor 270 may convert the received IP data into call data and transmit the converted call data to the first external device 100 through the first communicator 210. For example, when voice data is input from the second external device 300, the second external device 300 may transmit the voice data to an external server through the Internet. The external server may convert the voice data received from the second external device 300 into Internet data and transmit the VoIP call data to the second communicator 220 through the Internet. The processor 270 may convert the VoIP call data received through the second communicator 220 into the voice data and transmit the voice data to the first external device 100 through the first communicator 210.

Figure 3:
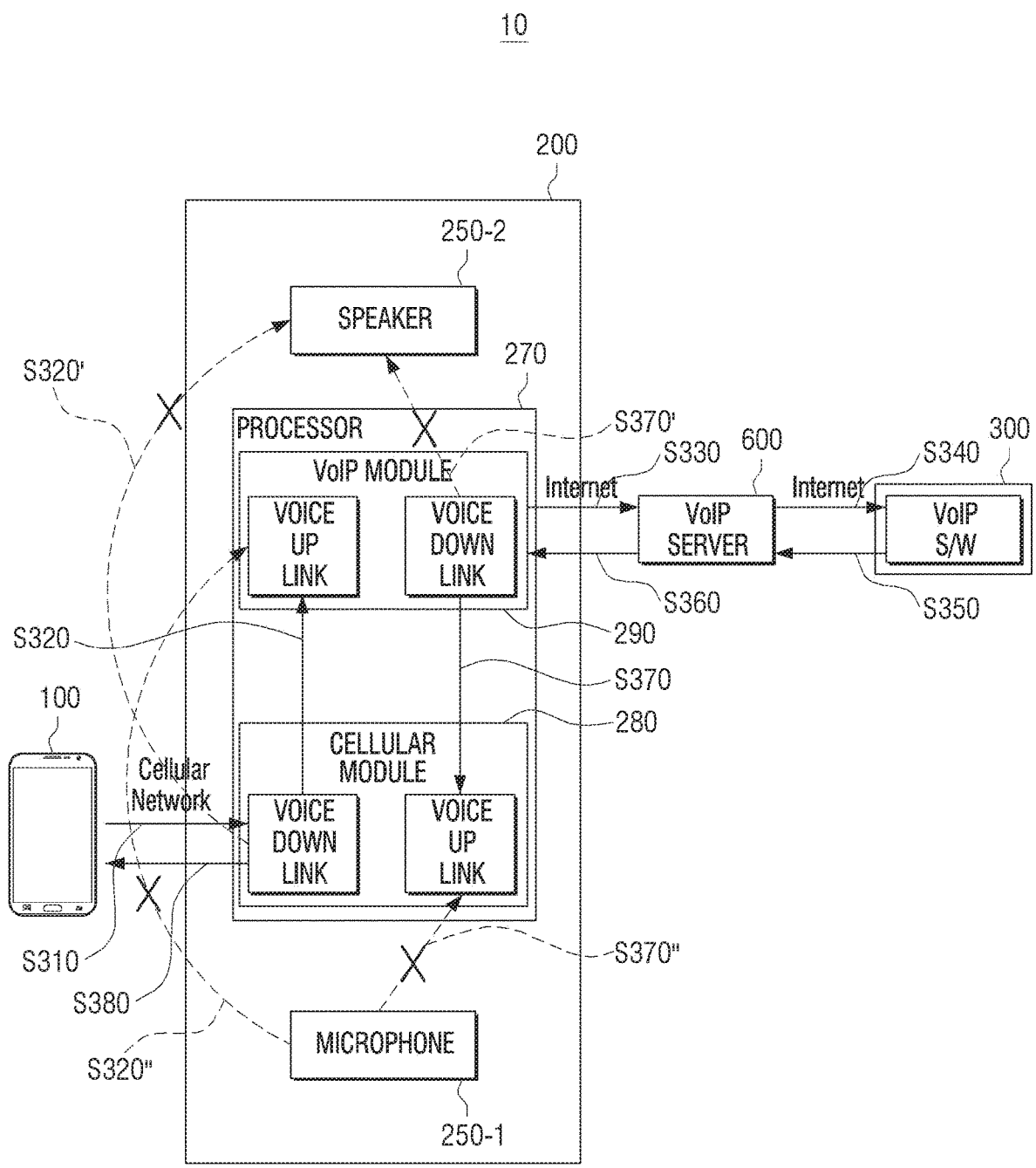
FIG. 3 is a diagram illustrating an operation of a system for providing a call control according to an embodiment of the disclosure.

FIG. 3 is a diagram illustrating an operation of a system for providing a call control according to an embodiment of the disclosure.

As illustrated in FIG. 3, the system 10 may include the first external device 100, which is a caller, the user terminal device 200, which is a callee, and the second external device 300 for retransmitting a call from the user terminal device 200. The number of the first external devices 100, the user terminal devices 200, and the second external devices 300 may be plural.

The processor 270 of the user terminal device 200 may include a cellular module 280 and a VoIP module 290. The cellular module 280 and the VoIP module 290 may be included in one call control module. The cellular module 280 and the VoIP module 290 may each include a voice up/down link module for controlling input and output of voice data.

The cellular module 280 may control the cellular network based phone call between the first external device 100 and the user terminal device 200. The cellular network based phone call may include a circuit switched voice call. The VoIP module 290 may control the VoIP phone call between the user terminal device 200 and the second external device 300. The VoIP phone call may be an Internet-based phone call.

After the call is established, the user terminal device 200 may receive voice data from the first external device 100 through the cellular network (S310). When the user terminal device 200 receives the voice data from the first external device 100, the cellular module 280 may control the microphone 250-1 and the speaker 250-2 to be disabled so that the voice data is not input or output through the user terminal device 200 in the cellular network based phone call (S320', S320"). In this case, the cellular module 280 may transmit the voice data received from the first external device 100 to the VoIP module 290 (S320).

The VoIP module 290 may convert the voice data received from the cellular module 280 into Internet Protocol (IP) data and transmit the converted IP data to a VoIP server 600 through the Internet (S330). In this case, the VoIP module 290 may include a command to enable the microphone and the speaker of the second external device 300 receiving the IP data. The VoIP server 600 may transmit the IP data received from the user terminal device 200 to the second external device 300 through the Internet (S340). The second external device 300 may include VoIP software for a VoIP call. The second external device 300 may convert the IP data received from the VoIP server into voice data using the VoIP software and output the converted voice data.

Meanwhile, the second external device 300 may input voice data for a phone call. In this case, the voice data input from the second external device 300 may be transmitted to the VoIP server 600 through the Internet in the form of IP data using the VoIP software (S350).

The VoIP server 600 may transmit the IP data received from the second external device 300 to the user terminal device 200 through the Internet (S360). When the user terminal device 200 receives the IP data from the VoIP server 600, the VoIP module 290 may convert the IP data into voice data and transmit the converted voice data to the cellular module (S370). In this case, the VoIP module 290 may control the microphone 250-1 and the speaker 250-2 to be disabled so that the voice is not input or output from the user terminal device 200 (S370', S370").

The cellular module 280 may transmit the voice data to the first external device 100 through the cellular network (S380).

Therefore, in the system 10 according to an embodiment of the disclosure, the voice data transmitted by the first external device 100 may not be output from the user terminal device 200 but may be output from the second external device 300. In addition, the voice data transmitted by the second external device 300 may not be output from the user terminal device 200 but may be output from the first external device 100. Accordingly, the user terminal device 200 may perform a call with the first external device 100 using the second external device 300 without releasing the call requested by the first external device 100.

According to another embodiment of the disclosure, the system 10 may include a plurality of second external devices 300. The user terminal device 200 may transmit a call request signal received from the first external device 100 to the plurality of second external devices 300 through the VoIP server 600. The VoIP server 600 may identify a VoIP account of the user terminal device 200 through VoIP account information included in the call request signal received from the user terminal device 200.

The VoIP server 600 may identify the plurality of second external devices 300 having the same VoIP account as the VoIP account of the user terminal device 200 stored in the VoIP server 600, and transmit the call request signal to a plurality of second external devices 300 which are connected to the Internet among the identified second external devices 300.

The VoIP server 600 may receive a call response message from at least one second external device 300 in response to a call request among the plurality of second external devices 300. The second external device 300 may transmit a response to the call request to the VoIP server 600 through an operation of picking up the call.

Accordingly, a call between the first external device 100, the user terminal device 200, and the plurality of second external devices 300 may be established. After the call is established, transmission and reception of voice data may be performed through the cellular module 280 and the VoIP module 290 described above. Therefore, the system 10 may be implemented such that the user terminal device 200 may serve as a gateway of a conference call or a multi-call to enable a multi-party call.

Figure 4:
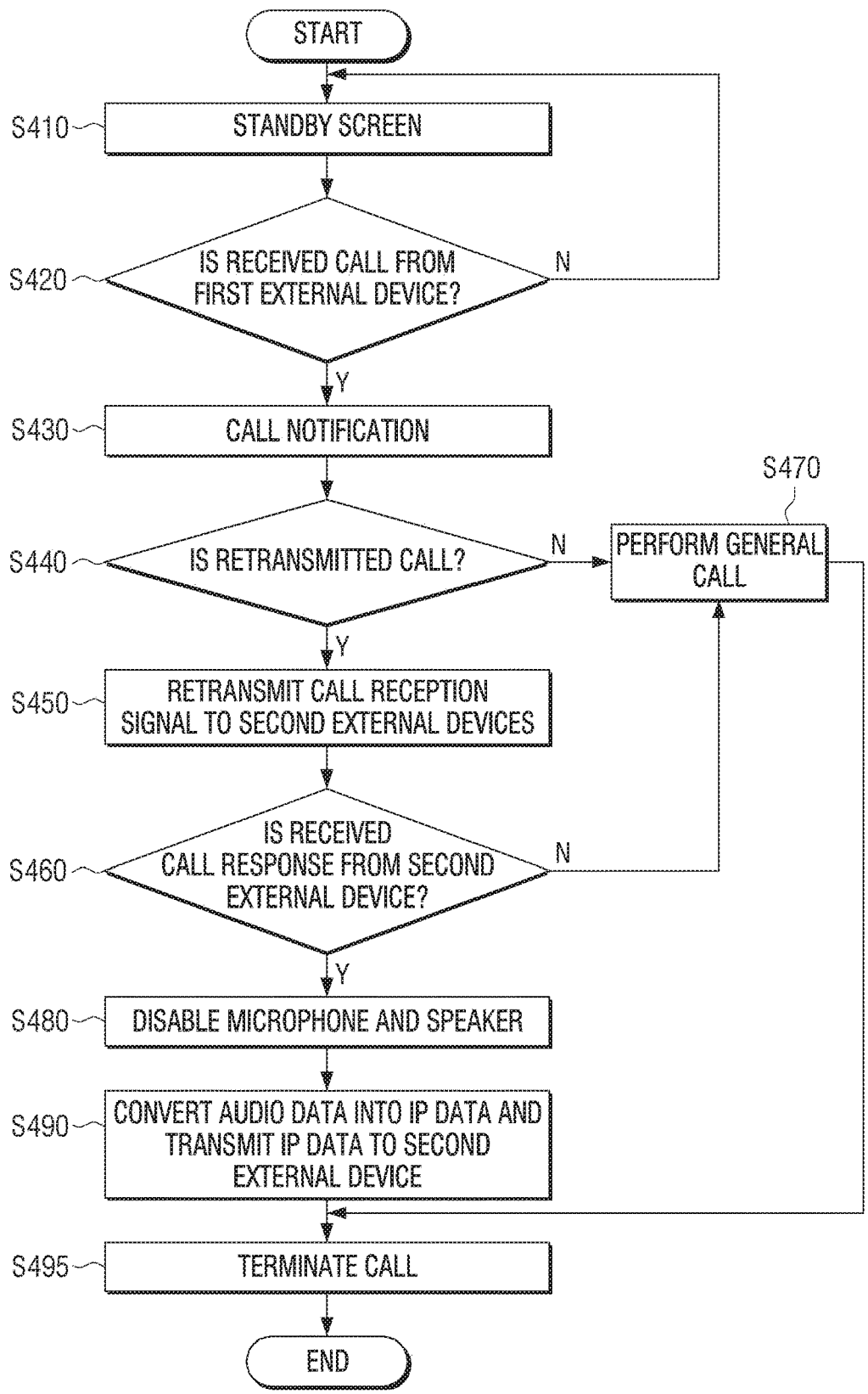
FIG. 4 is a flowchart illustrating a control method of a user terminal device according to an embodiment of the disclosure.

FIG. 4 is a flowchart illustrating a control method of a user terminal device according to an embodiment of the disclosure.

As illustrated in FIG. 4, the user terminal device 200 displays a standby screen (S410). For example, the user terminal device 200 may be in a standby mode before entering a call mode. The user terminal device 200 may be in a state of being connected to the Internet and a VoIP application providing a VoIP call may be executing in the background.

Thereafter, the user terminal device 200 determines whether a call is received from the first external device 100, which is the caller (S420).

If the call is received, the user terminal device 200 provides a call notification (S430). For example, the call notification may output sound such as ringtone, vibration, lamp, and the like and may display various call UIs.

Thereafter, the user terminal device 200 determines whether the call is retransmitted (S440). For example, if the VoIP application is executing in the user terminal device 200, the user terminal device 200 may determine that the call may be retransmitted. Therefore, the user terminal device 200 may transmit and receive call data related to the call to an external server through the Internet based on the VoIP application. If it is determined that the call may be retransmitted, the user terminal device 200 retransmits a call reception signal to the second external device 300 (S450).

On the other hand, if the call may not be retransmitted in the user terminal device 200, the user terminal device 200 performs a general call with the first external device 100 (S470). Specifically, the user terminal device 200 may perform a call with the first external device 100 on the user terminal device 200.

Meanwhile, the user terminal device 200 determines whether a call response is received from the second external device 300 retransmitting the call reception signal through the operation S450 described above (S460). As a result of the determination, if the call response signal is not received from the second external device 300, the user terminal device 200 performs the call with the first external device 100 on the user terminal device 200 through the operation S470 described above.

Meanwhile, if the call is received from the second external device 300, the user terminal device 200 controls the microphone and the speaker of the user terminal device 200 to be disabled (S480).

Thereafter, if the user terminal device 200 receives voice data from the first external device 100, the user terminal device 200 converts the received voice data into IP data and transmits the IP data to the second external device 300 (S490). Therefore, the voice data received from the first external device 100 may not be output from the user terminal device 200 but may be output from the second external device 300.

In addition, the user terminal device 200 may receive the voice data in the form of IP data from the second external device 300 for a phone call with the first external device 100. The user terminal device 200 may convert the IP data received from the second external device 300 into voice data and transmit the converted voice data to the first external device 100. In this case, the user terminal device 200 may control the microphone and the speaker to be disabled so that call related audio may not be input to and output from the user terminal device 200.

Therefore, in the call with the first external device 100, the user terminal device 200 may not input the voice data, and the voice data input from the second external device 300 may be output from the first external device 100. Thereafter, the user terminal device 200 receives a call termination request from the first external device 100, the user terminal device 200, or the second external device 300 and terminates the call (S495).

For example, the user terminal device 200 may receive the call termination request from the first external device 100.

As another example, the user terminal device 200 may input the call termination request from the user terminal device 200. As another example, the user terminal device 200 may receive the call termination request from the second external device 300. The user terminal device 200 may terminate the cellular network based call between the user terminal device 200 and the first external device 100 and terminate the VoIP network based call between the user terminal device 200 and the second external device 300 based on the received call termination request to terminate the call between the first external device 100 and the second external device 300.

Figure 5:
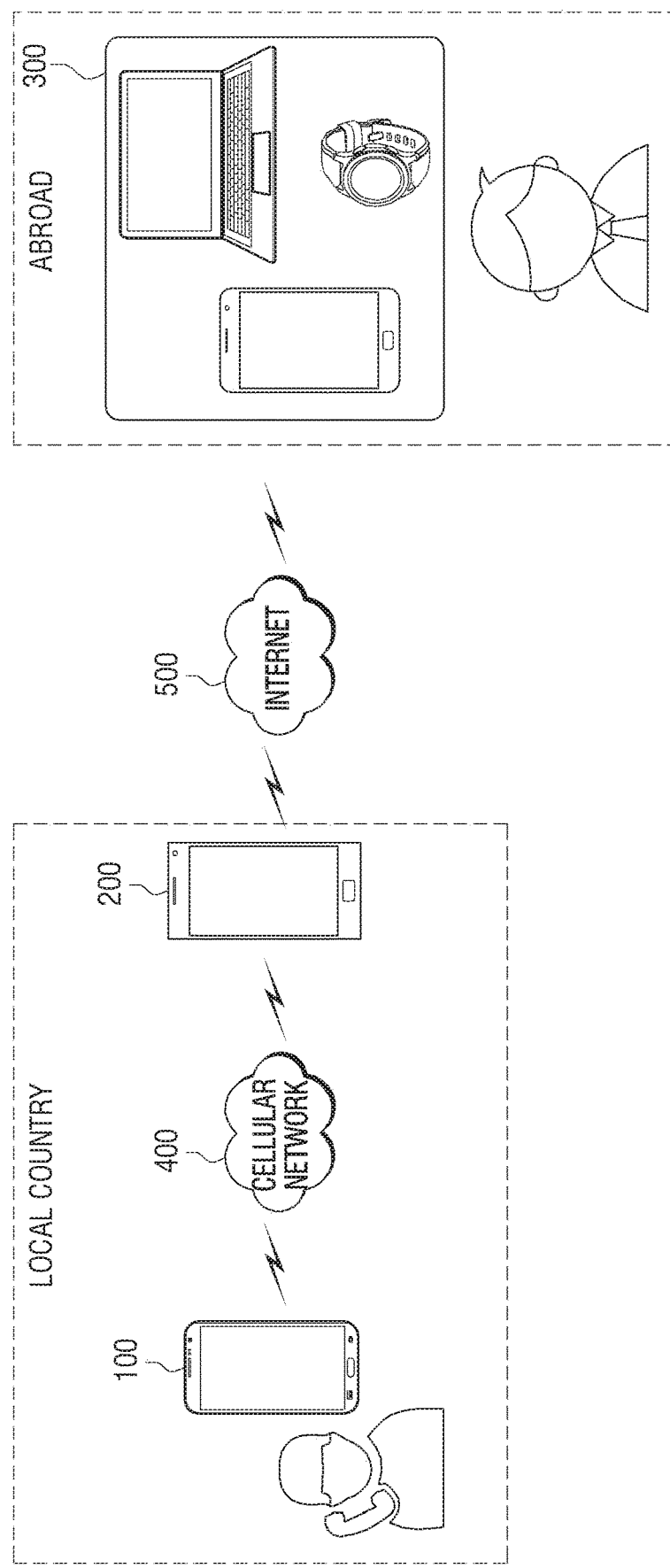
FIG. 5 is a diagram illustrating a call control operation of the user terminal device according to an embodiment of the disclosure.

FIG. 5 is a diagram illustrating a call control operation of the user terminal device according to an embodiment of the disclosure.

As illustrated in FIG. 5, the user terminal device 200 may receive a circuit switched voice call request from the first external device 100 through a cellular network in a local country.

In general, the circuit switched voice call may be established through the cellular network provided by the cellular provider between the caller and the callee, and the callee may not pay a call fee or a domestic fee may be charged.

For example, a user B using the user terminal device 200 may be abroad with a plurality of second external devices 300. The plurality of second external devices 300 may provide a VoIP call and may be in a state of being logged in to a VoIP application through a wired or wireless network with the same VoIP account as the user terminal device 200. The wired or wireless network may include a 3G or 4G network provided by the cellular provider. In this case, the user terminal device 200 may also be executing the VoIP application with the VoIP account through the Internet.

According to an embodiment of the disclosure, the user terminal device 200 may transmit the call request signal received from the first external device 100 to the plurality of second external devices 300 through the Internet 500.

If call acceptance is input from at least one of the plurality of second external devices 300, the user terminal device 200 may receive a call acceptance message from the second external device 300 through the Internet 500. The user terminal device 200 may transmit the call acceptance message received from the second external device 300 to the first external device 100 through the cellular network 400.

If the user terminal device 200 receives an acknowledgment (ACK) message for the call acceptance message from the first external device 100 through the cellular network 400, a cellular network based voice call may be established between the user terminal device 200 and the first external device 100, and an Internet based VoIP voice call may be established between the user terminal device 200 and the second external device 300. For example, the voice call may be a voice call or a video call. However, in the disclosure, the voice call is described for convenience of description but is not limited thereto.

Therefore, according to an embodiment of the disclosure, the user terminal device 200 may operate as a gateway for establishing the call between the first external device 100 and the second external devices 300. In addition, the user terminal device 200 may convert the voice data input from the first external device 100 into Internet data and transmit the converted Internet data to the second external device 300 through the Internet 500. The user terminal device 200 may receive the voice data input from the second external device 300 in a format of internet data through the internet 500, and convert the received Internet data into the voice data to transmit the voice data to the first external device 100.

Therefore, according to an embodiment of the disclosure, the user terminal device 200 may retransmit the cellular network based call received from the first external device 100 in a local country to the second external devices 300 in abroad as an Internet based call. Thereby, the user terminal device 200 may save a call charge by performing an international call by applying a domestic call charge.

In addition, according to another embodiment of the disclosure, if a battery level of at least one second external device 300 that accepts the call is a predetermined amount or less, the second external device 300 may transmit a call retransmission request through the Internet 500 to the other external device 300 having the same VoIP account. If the other external device 300 accepts the call retransmission request, the user terminal device 200 may establish the VoIP call with the other external device 300 to maintain the call with the first external device 100.

Figure 6:
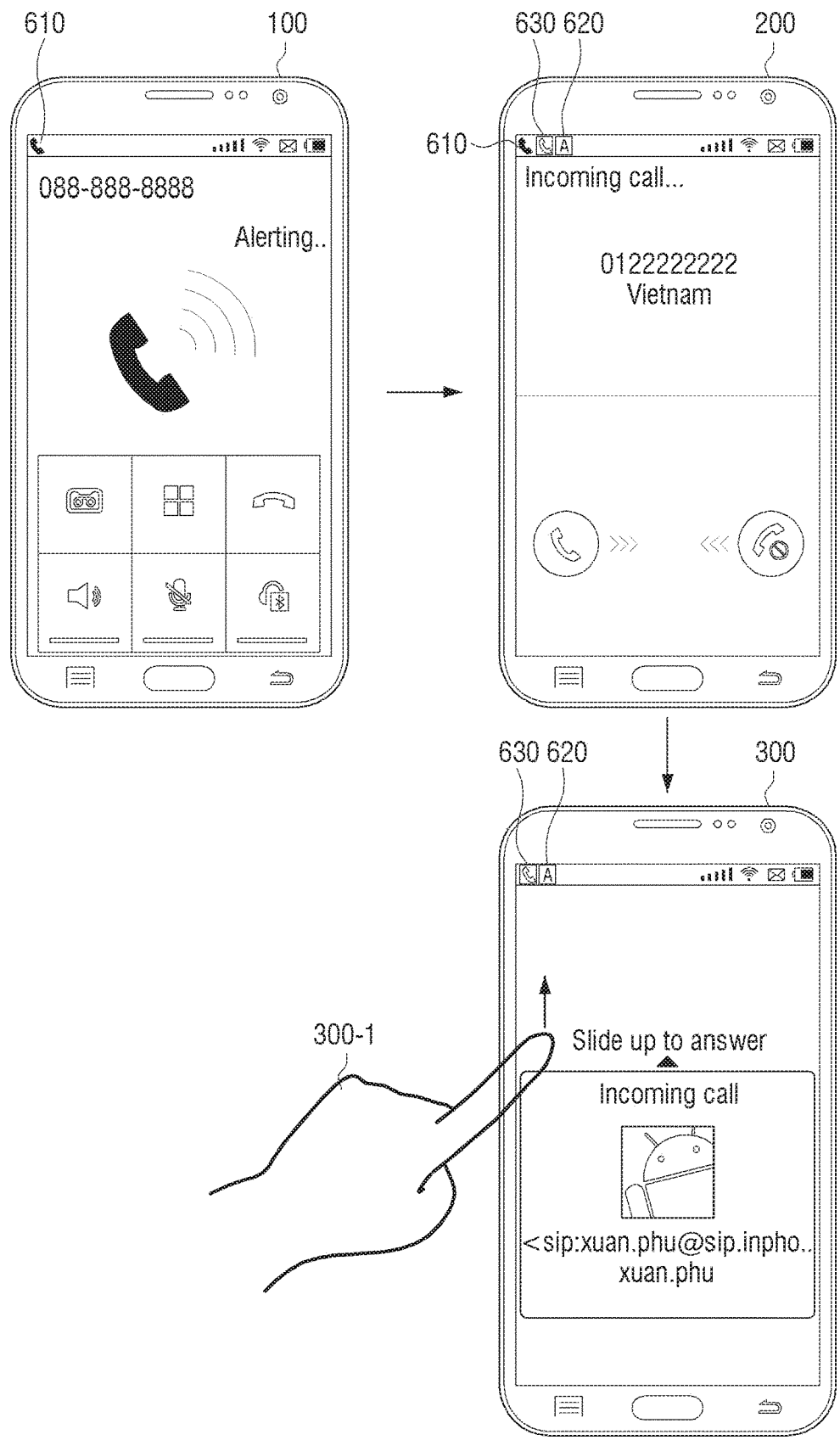
FIGS. 6 to 8 are diagrams illustrating a user interface (UI) of the user terminal device and a plurality of external devices according to an embodiment of the disclosure.
Figure 7:
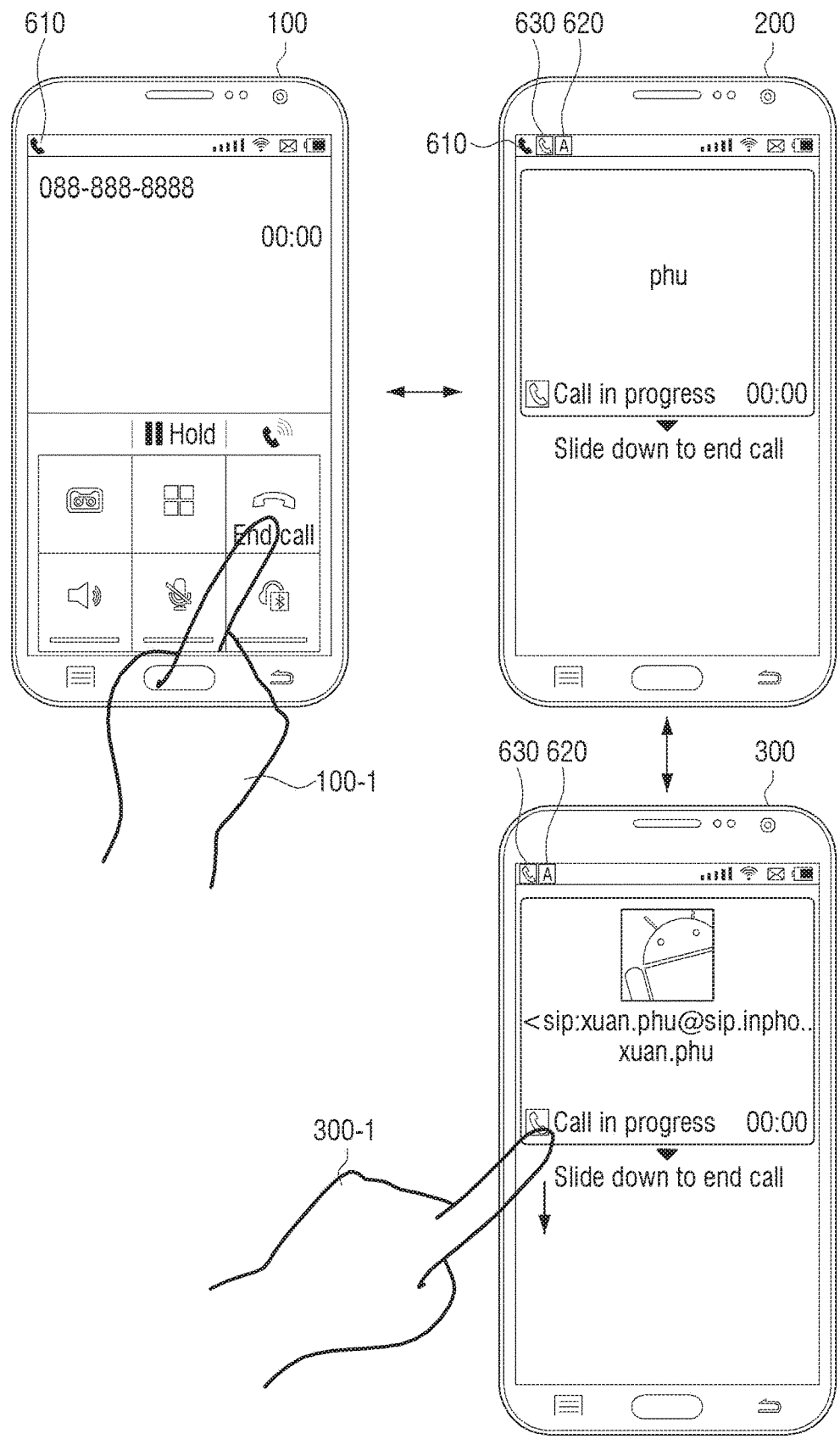
Figure 8:
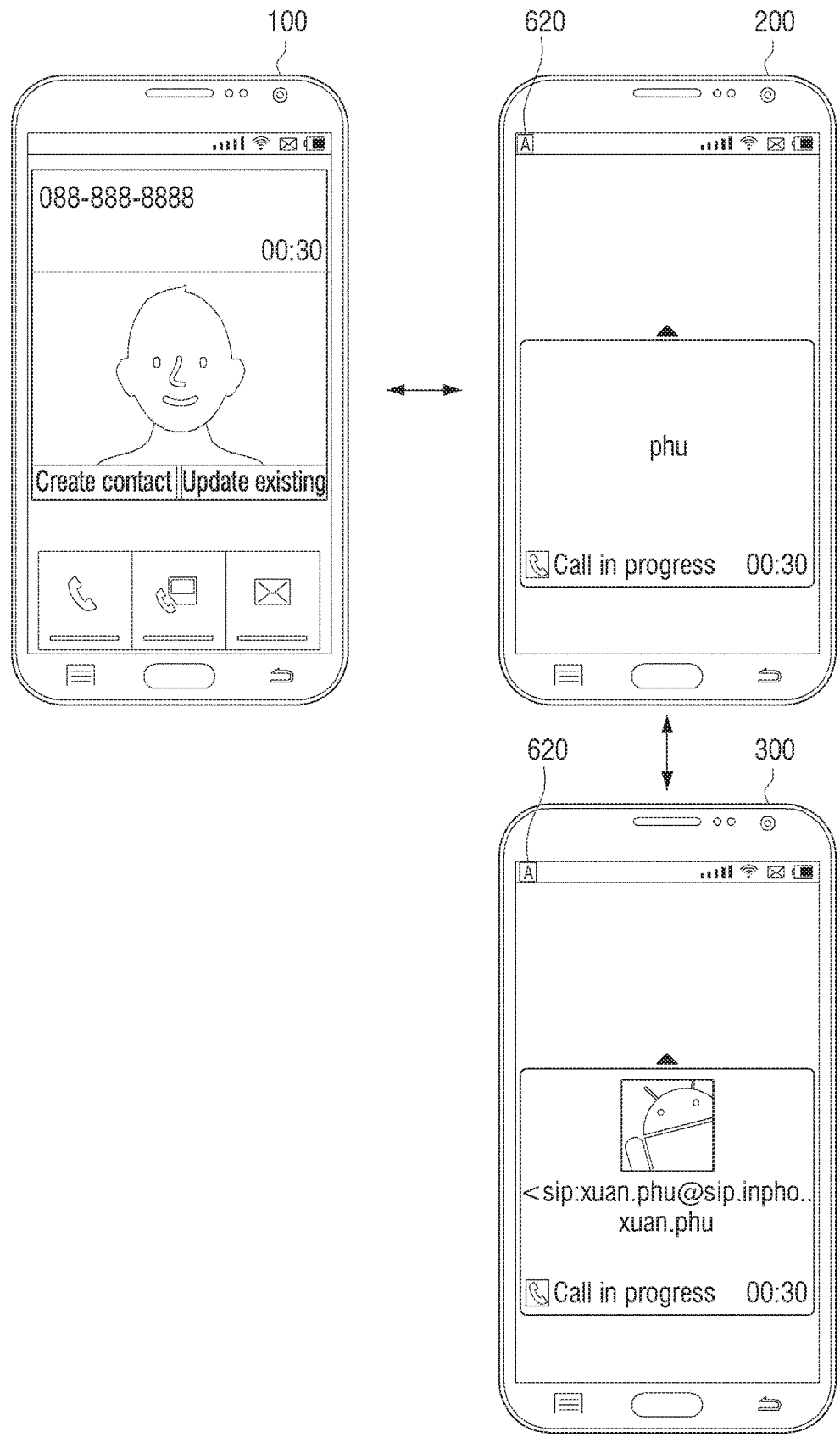

FIGS. 6 to 8 are diagrams illustrating a user interface (UI) of the user terminal device and a plurality of external devices according to an embodiment of the disclosure.

FIG. 6 is a diagram illustrating that the user terminal device 200 retransmits a call request received from the first external device 100 to the second external device 300.

Specifically, as illustrated in FIG. 6, the first external device 100 may call the identification number 088-888-8888 of the user terminal device 200. In this case, the first external device 100 may display a first icon 610 indicating the cellular network based call.

If the user terminal device 200 receives the call request from the first external device 100, the user terminal device 200 may transmit a call request signal to the second external device 300. In addition, if the user terminal device 200 receives a call request from the first external device 100, the user terminal device 200 may display a cellular network based first call UI. If the user terminal device 200 is connected to the Internet and is executing the VoIP application, the user terminal device 200 may display a second icon 620 indicating the VoIP application on a background screen.

In a state in which the second icon 620 is being displayed, the user terminal device 200 may receive the call request signal from the first external device 100. In this case, the first call UI may include the first icon 610 indicating the cellular network based call, the second icon 620 indicating the VoIP application, and a third icon 630 indicating a VoIP call.

If the second external device 300 receives the call request signal from the user terminal device 200 while the VoIP application is executing, the second external device 300 may display a third call UI corresponding to the VoIP call. The third call UI may include the second icon 620 indicating the VoIP application and the third icon 630 indicating the VoIP call. The third call UI may include VoIP account information, device information, and location information of the user terminal device 200 included in the call request signal received from the user terminal device 200 as identification information of the user terminal device 200. The third call UI may include an input icon for accepting the call through a user input, but is not limited thereto.

If the call is accepted by a user 300-1 at the second external device 300, a call between the first external device 100, the user terminal device 200, and the second external device 300 may be established. In this case, the cellular network based call may be established between the first external device 100 and the user terminal device 200, and the VoIP call may be established between the user terminal device 200 and the second external device 300.

FIG. 7 is a diagram illustrating that a call is established between the first external device, the user terminal device, and the second external device.

Specifically, in FIG. 6 described above, if the call is accepted by the user 300-1 at the second external device 300, the first external device 100, the user terminal device 200, and the second external device 300 may display the respective call UIs indicating the call progress level as illustrated in FIG. 7.

For example, the user terminal device 200 may display a second call UI by changing a first call UI illustrated in FIG. 6 to correspond to a third call UI of the second external device 300. For example, the second call UI displayed on the user terminal device 200 may include the same call information and the UI frame as the third call UI displayed on the second external device 300 except for caller identification information. The user terminal device 200 may display the first icon 610 indicating the cellular network based call and the third icon 630 indicating the VoIP call. The user terminal device 200 may display the second call UI while the call between the first external device 100 and the second external device 300 is maintained.

The first external device 100, the user terminal device 200, and the second external device 300 may each input a call termination. For example, the first external device 100 may terminate the call by inputting the call termination by a caller 100-1. The user terminal device 200 and the second external device 300 may respectively terminate the call by inputting the call termination by a callee 300-1.

FIG. 8 is a diagram illustrating a call termination between the first external device 100, the user terminal device 200, and the second external device 300.

For example, in FIG. 7 described above, a call termination request may be input by the caller 100-1 or the callee 300-1. As described above, if the call termination request is input by the caller 100-1 or the callee 300-1, the first external device 100, the user terminal device 200, and the second external device 300 may each display a call UI corresponding to the call termination, as illustrated in FIG. 8. In this case, the call UI of the first external device 100 may not include the first icon 610 illustrated in FIG. 7 described above. In addition, the user terminal device 200 may not include the first icon 610 and the third icon 630 illustrated in FIG. 7. Further, the second external device 300 may not include the third icon 630 illustrated in FIG. 7.

Meanwhile, the user terminal device 200 and the second external device 300 may continue to display the second icon 620 indicating the VoIP application even after the call is terminated. In addition, a call termination UI of the user terminal device 200 may be displayed to correspond to a call termination UI of the second external device 300. For example, the call termination UI of the user terminal device 200 may have the same frame as the call termination UI of the second external device 300 and include the same call termination information as the call termination UI of the second external device 300. Meanwhile, the call termination UI of the user terminal device 200 may have caller identification information displayed differently from the call termination UI of the second external device 300.

The UIs illustrated in FIGS. 6 to 8 described above are only examples for describing the disclosure and are not limited thereto and may be implemented through various UIs.

Figure 9:
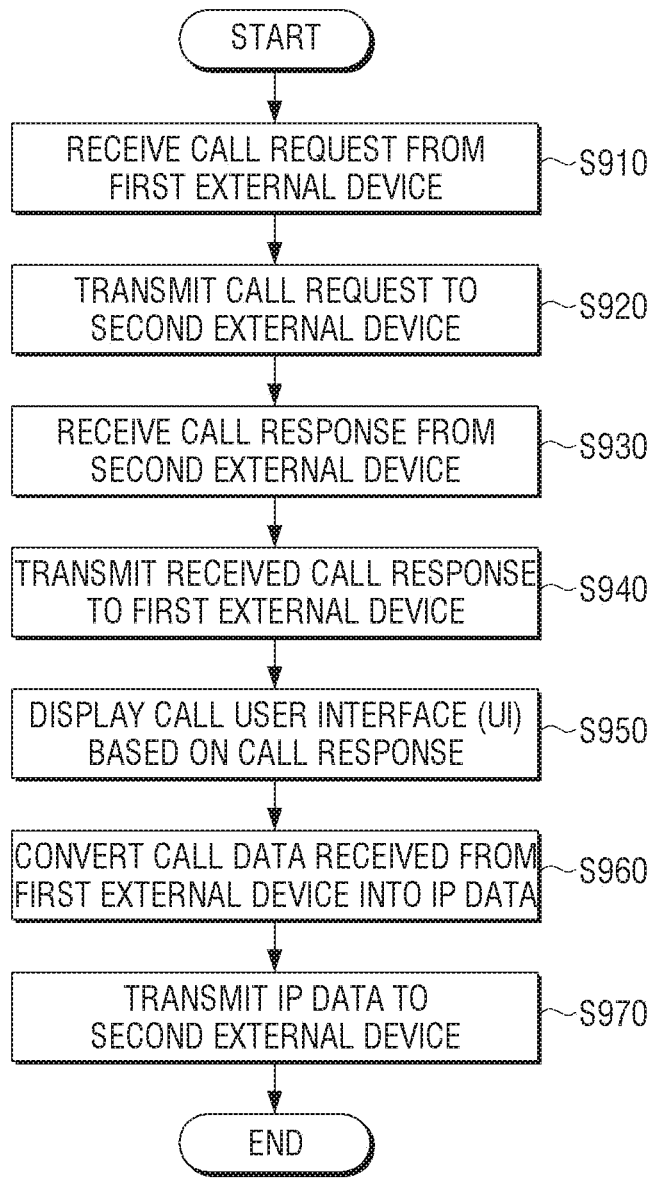
FIG. 9 is a flowchart illustrating a call control method of a user terminal device according to an embodiment of the disclosure.

FIG. 9 is a flowchart illustrating a call control method of a user terminal device according to an embodiment of the disclosure.

Referring to FIG. 9, the user terminal device 200 receives a call request from the first external device 100 (S910).

For example, the first external device 100 and the user terminal device 200 may provide cellular network communication such as 2G, 3G, and 4G. The first external device 100 may be an analog telephone. The user terminal device 200 may receive a call request signal from the first external device 100 through a general public telephone network or a cellular network.

Thereafter, the user terminal device 200 transmits the call request signal received from the first external device 100 to the second external device 300 (S920).

The second external device 300 may be various devices capable of accessing a web browser through the Internet. In this case, the user terminal device 200 and the second external device 300 may be in a state of being accessed to a VoIP server through the Internet with the same VoIP account. The user terminal device 200 may transmit the call request signal received from the first external device 100 to the VoIP server through the Internet. The second external device 300 may receive the call request signal transmitted by the user terminal device 200 from the VoIP server through the Internet.

Thereafter, the user terminal device 200 receives a call response from the second external device 300 (S930). According to a user input of accepting the call response from the second external device 300, the user terminal device 200 may receive a call response message from the VoIP server through the Internet.

Thereafter, the user terminal device 200 transmits the call response message received from the VoIP server to the first external device 100 (S940). In this case, the first external device 100 may establish a cellular network based call between the first external device 100 and the user terminal device 200 by transmitting an acknowledge message for the call response to the user terminal device 200 through the cellular network. The user terminal device 200 may establish a VoIP call between the user terminal device 200 and the second external device 300 by transmitting the acknowledge message to the second external device 300 through the Internet.

Thereafter, the user terminal device 200 displays a call UI based on the call response (S950).

For example, if the user terminal device 200 receives the call request from the first external device 100, the user terminal device 200 may display the call UI and may display the call UI while changing the call UI based on the call response.

Thereafter, the user terminal device 200 converts call data received from the first external device 100 into Internet Protocol (IP) data (S960). The call data may include circuit switched voice call related data, and the Internet data may be VoIP packet data.

Meanwhile, the user terminal device 200 may receive the IP data from the second external device 300. The user terminal device 200 may convert the IP data received from the second external device 300 into the call data. In this case, the user terminal device 200 may control the microphone and the speaker of the user terminal device 200 to be disabled to limit voice input/output for the telephone call in the user terminal device 200.

Thereafter, the user terminal device 200 transmits the converted IP data to the second external device 300 through the Internet (S970).

Therefore, the voice data received from the first external device 100 may be output through the second external device 300. In addition, the user terminal device 200 may transmit the converted call data to the first external device 100 through the cellular network. Therefore, the call data received from the second external device 200 may be output through the first external device 100.

Therefore, through the method described above, in the user terminal device 200 according to an embodiment of the disclosure, the cellular network based call received from the first external device in the Internet-enabled existing user terminal device 200 may be converted into the VoIP call data and retransmitted to the second external device, without an additional hardware configuration or a separate hardware device.

FIGS. 10 to 13 are diagrams illustrating an operation of performing a call between the user terminal device and the plurality of external devices according to an embodiment of the disclosure.

The method of converting data in the user terminal device 100 after the call is established has been described in detail with reference to FIGS. 1 to 9, and detailed description thereof will be thus omitted in FIGS. 10 to 13.

Figure 10:
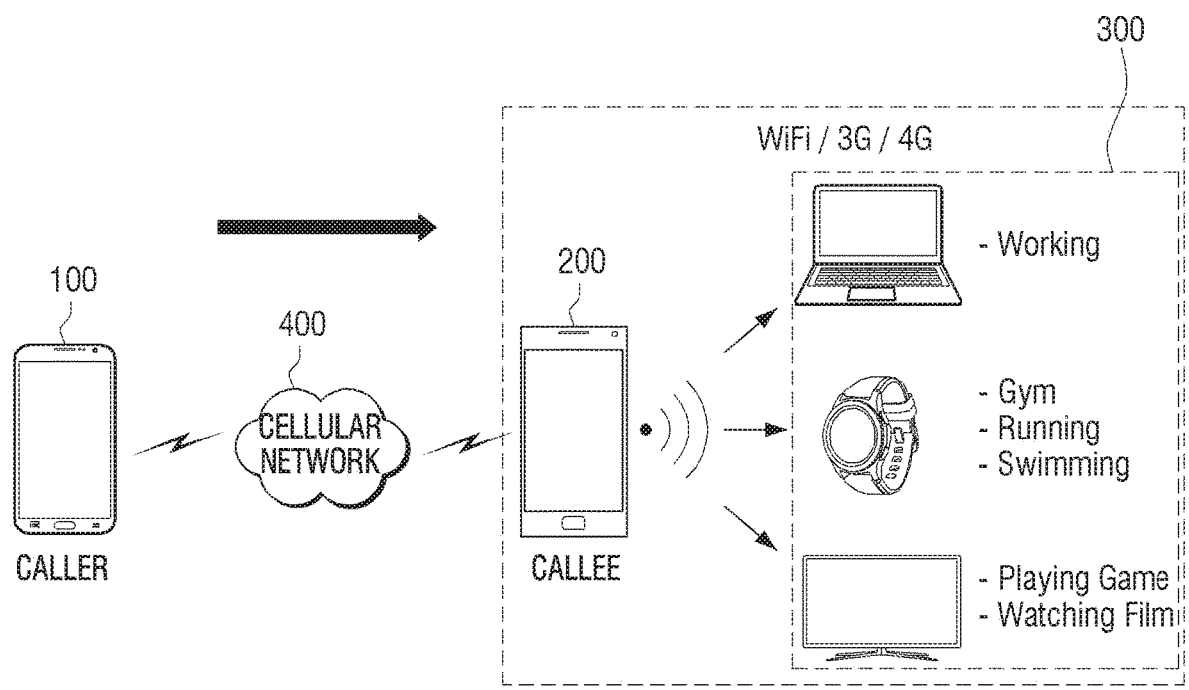
FIGS. 10 to 13 are diagrams illustrating an operation of performing a call between the user terminal device and the plurality of external devices according to an embodiment of the disclosure.

FIG. 10 is a diagram illustrating an example in which the user terminal device 200 and the plurality of second external devices 300 are located at different places in the same country.

As illustrated in FIG. 10, the user terminal device 200 may be in a state capable of accessing an Internet web browser through a network such as Wifi, 3G, 4G, or the like. The plurality of second external devices 300 may be in a state capable of accessing an Internet web browser through a network such as Wifi, 3G, 4G, LAN or the like at a different location from the user terminal device 200.

For example, the first external device 100 and the user terminal device 200 may be smartphones, but are not limited thereto. The second external device 300 may be a laptop, a desktop, a wearable device, and a digital television, but is not limited thereto. For example, the user terminal device 200 may be located on a first floor of a building, and the laptop, which is the second external device 300, may be located on a second floor of the building.

The user terminal device 200 and the plurality of second external devices 300 may access the VoIP server through the same VoIP account, but may be located in different places.

The user terminal device 200 may receive a call request from the first external device 100 through the cellular network 400. In this case, the user of the user terminal device 200 may be located on the second floor of the building where the laptop is located. The user terminal device 200 may transmit the call request signal received from the first external device 100 to the plurality of second external devices 300 through the Internet. The user may response the received call from the first external device 100 through the laptop, which is the second external device 300.

Therefore, according to an embodiment of the disclosure, the cellular network based call may be established between the first external device 100 and the user terminal device 200, and the VoIP call may be established between the user terminal device 200 and the laptop, which is the second external device 300. After the call is established, the first external device 100, the user terminal device 200, and the second external device 300 may transmit and receive the call data to each other according to the above-described embodiments of the disclosure.

Meanwhile, according to another embodiment of the disclosure, the user terminal device 200 may request a call to another second external device 300 based on state information of the second external device 300 that has accepted the call.

For example, when a battery of the laptop, the second external device 300 that has accepted the call, has a predetermined level or less, the second external device 300 may transmit battery state information to the user terminal device 100. In this case, the second external device 300 may also transmit state information to the user terminal device 100 through short-range communication or may also transmit the information through an external server.

The user terminal device 200 may request a call to another callable second external device 300 based on the state information received from the second external device 300. The user terminal device 200 may request information on another callable second external device 300 through the VoIP server. The VoIP server 600 may identify another second external device 300 that is accessing the VoIP server with the same VoIP account as the user terminal device 200 and request the call with the user terminal device 200.

For example, if an acceptance for the call request is received from the desktop, which is another second external device 300, the user terminal device 200 may release the call with the laptop and establish a call with the desktop. Therefore, the user terminal device 200 may maintain a call with the first external device 100 using the plurality of second external devices 300.

In general, the call of the user terminal device 200 may be disconnected when signal strength for the cellular network based call is weak.

Therefore, according to another embodiment of the disclosure, when the cellular network based call signal has a predetermined signal strength or less, the user terminal device 200 may retransmit the call received from the first external device 100 to the second external device 300 having the same VoIP account as the user terminal device 200. In this case, the user terminal device 200 may be located near the second external device 300.

Therefore, according to an embodiment of the disclosure, even if the user terminal device 100 does not include an additional sensor for detecting a state in which the second external device 300 is adjacent to the user terminal device 100, the user terminal device 100 may maintain the call with the first external device 100 by retransmitting the call received by the user terminal device 100 to the second external device 300 through the Internet.

Figure 11:
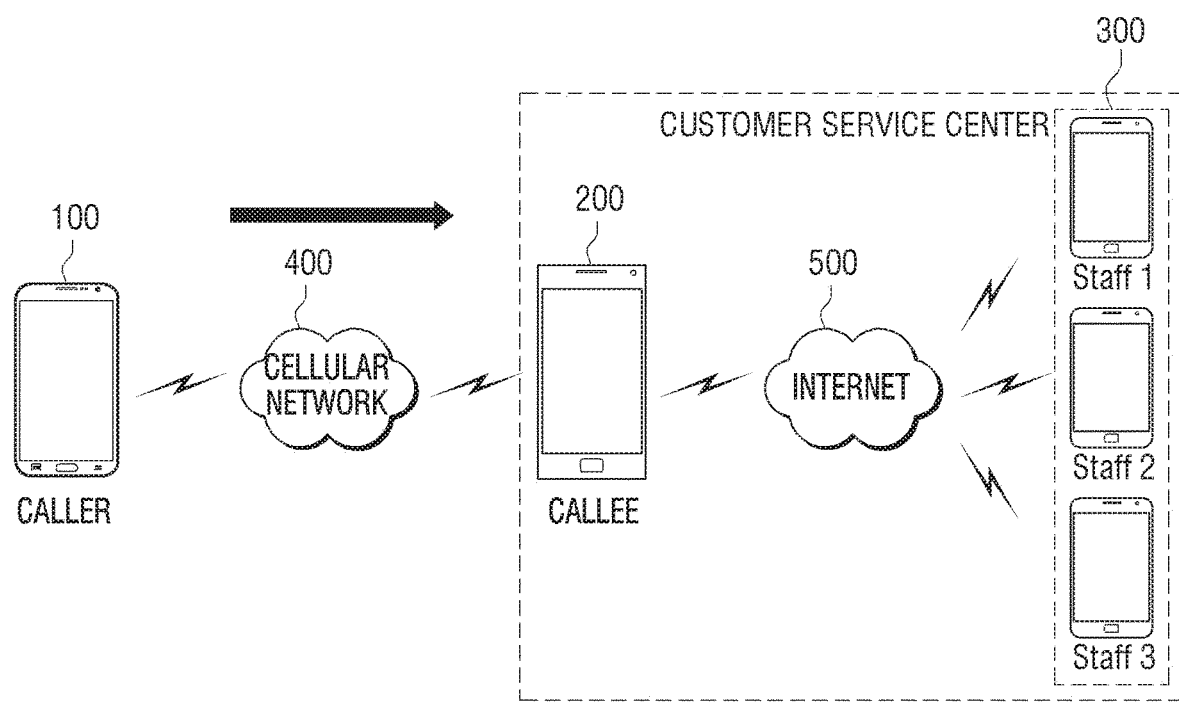

FIG. 11 is a diagram illustrating a method of controlling a call using a user terminal device in a customer service center.

As illustrated in FIG. 11, the user terminal device 200 may simultaneously transmit the call request signal received from the first external device 100 through the cellular network 400 to staffs 300 of the customer service center through the internet 500. The user terminal device 200 and the second external devices 300 used by the staffs (staff 1, staff 2, and staff 3) may be in a state of being accessed to the VoIP server through the Internet with the same VoIP account. Therefore, if a customer requests a call to the user terminal device 200 through the first external device 100, the user terminal device 200 may retransmit the call request signal to the second external devices 300 having the same VoIP account as the user terminal device 200.

For example, if the call request is accepted from the staff 1, the user terminal device 200 may serve as a gateway of a call between the first external device 100 and the second external device 300 of the staff 1. Therefore, according to an embodiment of the disclosure, the staffs of the customer service center may not perform the call with the customer through the second external devices fixed at fixed locations and re-receive the call of the customer from the user terminal device 200 anywhere in the Internet-enabled area.

Figure 12:
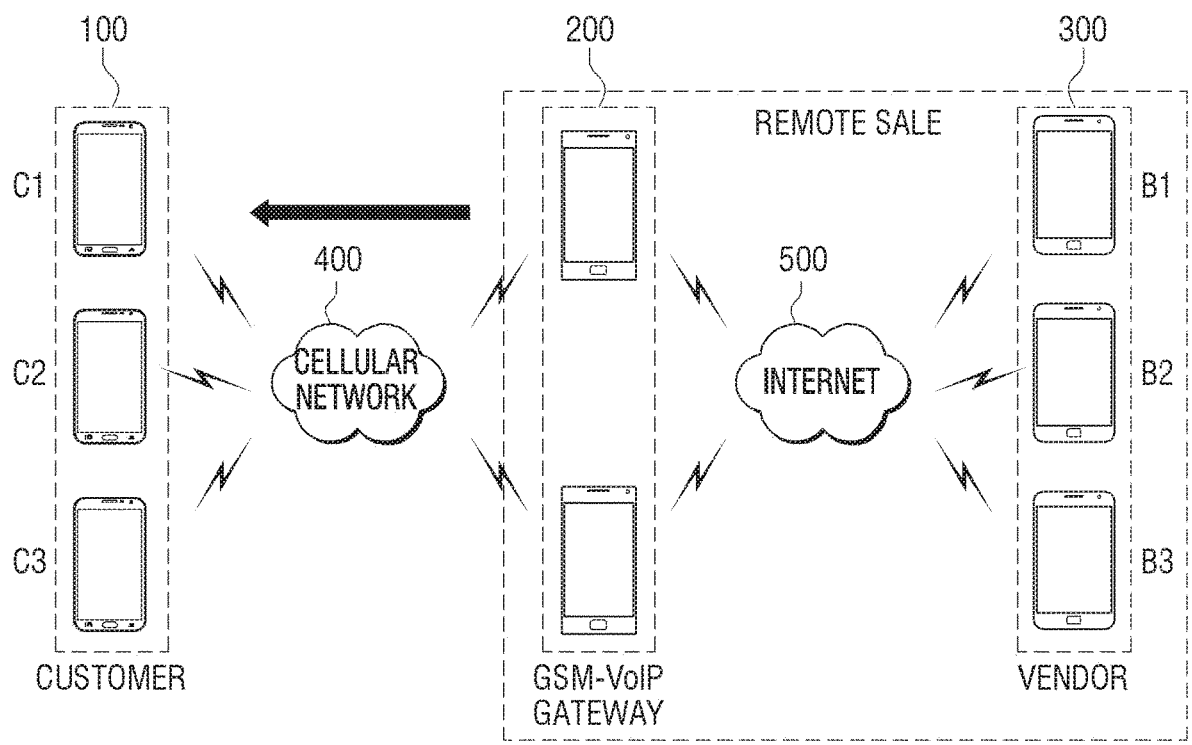
Figure 13:
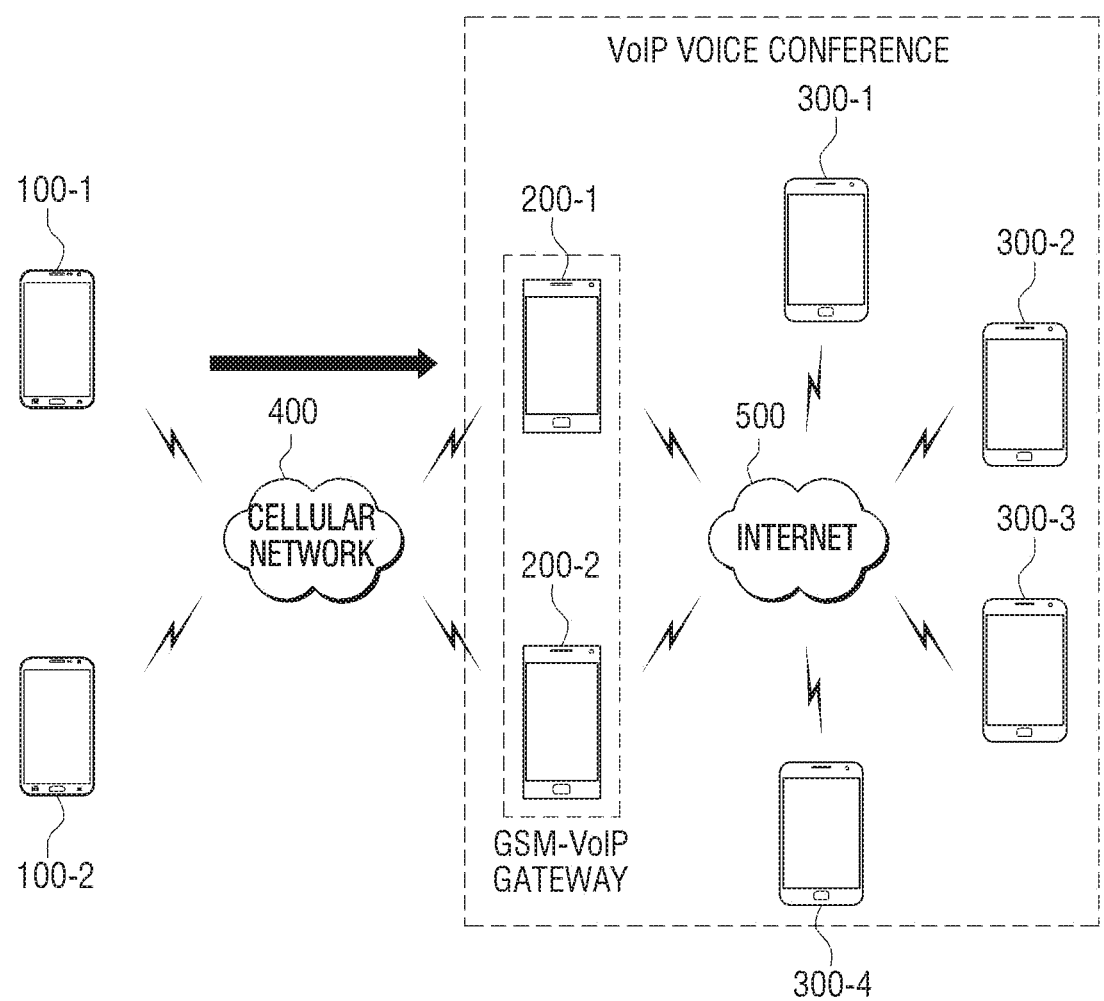

FIGS. 12 and 13 are diagrams illustrating an example in which the user terminal device operates as a VoIP-GSM gateway.

As illustrated FIG. 12, the first external device 100 may be callers owned by different customers C1, C2, and C3. The user terminal device 200 may be a plurality of callees used by the same user. The second external device 300 may be external devices capable of performing a VoIP call owned by each of a plurality of vendors B1, B2, and B3 making remote sales. The plurality of user terminal devices 200 and the plurality of second external devices 300 may be in a state of being accessed to a VoIP server through the Internet with the same VoIP account.

The plurality of vendors B1, B2, and B3 may access the Internet 500 and simultaneously transmit call requests to the plurality of user terminal devices 200 through the VoIP server. The VoIP server identifies the user terminal device 200 that is not busy among the plurality of user terminal devices 200 and transmits a VoIP call request to the identified user terminal device 200. The user terminal device 200 may transmit the VoIP call request received from the second external device 300 to the plurality of first external devices 100 through the cellular network 400.

According to an embodiment, the user terminal device 200 may perform a call between the first external device 100 that has accepted the call among the plurality of first external devices 100 and the second external devices 300. Therefore, the user terminal device 200 may operate as a GSM-VoIP gateway device between the first external device 100 and the second external device 300 without being connected to a hardware device such as a separate GSM VoIP router.

As illustrated in FIG. 13, first external devices 100-1 and 100-2 may transmit conference call request signals to user terminal devices 200-1 and 200-2 through the cellular network 400. The plurality of user terminal devices 200-1 and 200-2 may be in a state of being accessed to a VoIP server through the Internet with the same VoIP account. The plurality of user terminal devices 200-1 and 200-2 may transmit the conference call requests received from the plurality of first external devices 100-1 and 100-2 to the second external devices 300-1, 300-2, 300-3, and 300-4 which are being accessed to the VoIP server through the Internet 500 with the same VoIP account as the user terminal devices 200-1 and 200-2.

For example, the plurality of first external devices 100-1 and 100-2 may request a conference call to the user terminal device 200-1. As another example, the first external device 100-1 may request the conference call to the user terminal device 200-1, and the first external device 100-2 may also request the conference call to the user terminal device 200-2. The user terminal device, which is not busy, among the plurality of user terminal devices 200-1 and 200-2 may request the conference call to the second external devices 300-1, 300-2, 300-3, and 300-4 capable of performing the VoIP call through the VoIP server. If the conference call requests are accepted from the second external devices 300-1, 300-2, 300-3, and 300-4, the user terminal device 200-1 and/or 200-2 may operate as a GSM-VoIP gateway device between the first external devices 100-1 and 100-2 and the second external devices 300-1, 300-2, 300-3, and 300-4.

Figure 14:
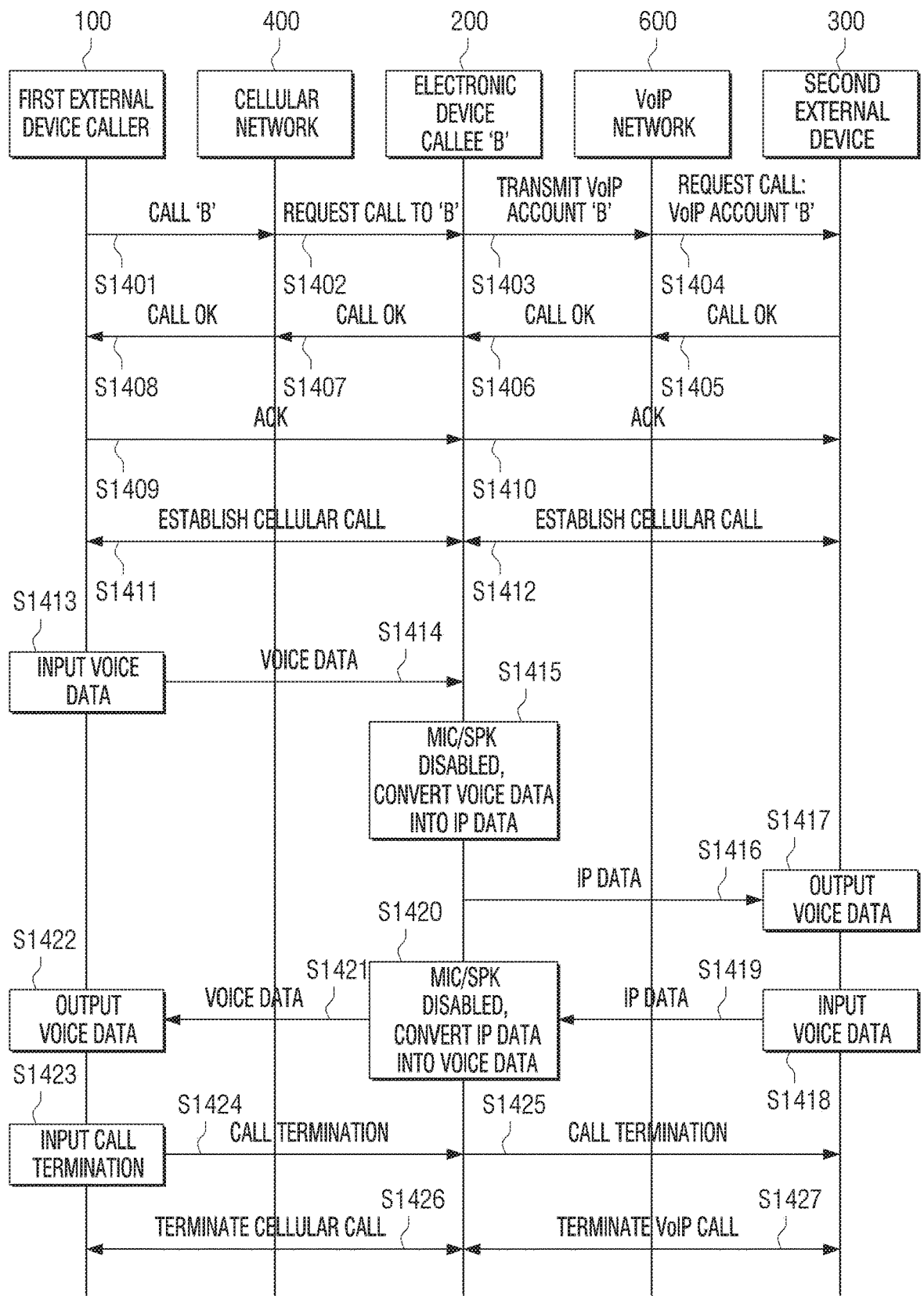
FIG. 14 is a procedure of a system for providing a call control according to an embodiment of the disclosure.

FIG. 14 is a procedure of a system for providing a call control according to an embodiment of the disclosure.

The first external device 100 may be a caller device. The user terminal device 200 may be a callee device. The user terminal device 200 and the second external device 300 may be in a state of being accessed to a VoIP server through the Internet with the same VoIP account as each other. For example, the user terminal device 200 and the second external device 300 may have the same VoIP application downloaded and executed from an external server.

Data transmitted and received between the first external device 100 and the user terminal device 200 may be circuit switched based data, and data transmitted and received between the user terminal device 200 and the second external device 300 may be IP packet based data. Therefore, the user terminal device 200 may convert the received circuit switched based data and IP packet based data into each other and transmit the converted data to the first external device 100 and the second external device 300.

As illustrated in FIG. 14, the first external device 100 transmits a call request signal to the cellular network 400 based on an identification number (e.g., a phone number) of a callee B according to a user command (S1401). Here, the cellular network 400 may be a network provided by a cellular provider.

The cellular network 400 requests a call to the user terminal device 200 having the identification number of the callee B (S1402). Thereafter, the user terminal device 200 transmits the call request signal received from the cellular network 400 to the VoIP network 600 (S1403).

In this case, the user terminal device 200 may transmit VoIP account information of the user terminal device 200 to the VoIP network 600. The VoIP network 600 may be a VoIP server for providing or managing a VoIP application. The VoIP account information may be in Internet protocol format, but is referred to as "B" for convenience of description. The user terminal device 200 may display a cellular call UI corresponding to the received call request signal.

The VoIP network 600 may identify the second external device 300 that is accessing the VoIP network 600 through the Internet with the same VoIP account "B" as the user terminal device 200 and request a VoIP call to the second external device 300 (S1404). If the second external device 300 receives the VoIP call request from the VoIP network 600, the second external device 300 may display information on call reception on a display of the second external device 300 or output a notification sound through a VoIP call UI.

Thereafter, the second external device 300 may input a call reception response. The input call reception response is transmitted to the VoIP network 600 (S1405).

The VoIP network 600 transmits a call response signal of the second external device 300 to the user terminal device 200, and the user terminal device 200 transmits the call response signal to the cellular network 400 (S1406 and S1407).

The cellular network 400 transmits the call response signal received from the user terminal device 200 to the first external device 100, and the first external device 100 transmits an acknowledgment (ACK) message for the call response signal to the user terminal device 200 through the cellular network 400 (S1408 and S1409).

Thereafter, the user terminal device 200 transmits the ACK message for the call response signal to the second external device 300 through the VoIP network 600 (S1410).

Therefore, the first external device 100 and the user terminal device 200 establish a cellular call using the cellular network 400, and the user terminal device 200 and the second external device 300 establish a VoIP call using the VoIP network 600 (S1411 and S1412). In this case, the user terminal device 200 may change and display the cellular call UI to correspond to the VoIP call UI displayed on the second external device 300.

Meanwhile, S1411 and S1412 are described sequentially, but the cellular call and the VoIP call may be established at the same time.

Meanwhile, if voice data of the user of the first external device 100 is input, the first external device 100 transmits the input voice data to the user terminal device 200 through the cellular network 400 (S1413 and S1414).

Therefore, the user terminal device 200 controls the microphone and the speaker of the user terminal device 200 to be disabled, converts the voice data into IP data, and transmits the converted IP data to the second external device 300 through the VoIP network 600 (S1415 and S1416).

Therefore, if the second external device 300 receives the IP data, the second external device 300 converts the received IP data into voice data using the VoIP application and outputs the voice data (S1417).

Meanwhile, if the voice data of the user is input to the second external device 300, the second external device 300 converts the voice data into IP data using the VoIP application and transmits the IP data to the user terminal device 200 through the VoIP network 600 (S1418 and 1419).

The user terminal device 200 controls the microphone and the speaker of the user terminal device 200 to be disabled, and converts the IP data into the voice data (S1420).

Thereafter, the user terminal device 200 transmits the converted voice data to the first external device 100 through the cellular network 400, and the first external device 100 outputs the voice data received from the user terminal device 200 (S1421 and S1422).

Therefore, the user terminal device 200 transmits a call termination signal BYE to the second external device 300 through the VoIP network 600, thereby terminating (releasing) the cellular call between the first external device 100 and the user terminal device 200 (S1425 and S1426).

Meanwhile, S1425 and S1426 are described sequentially, but may operate simultaneously. In addition, a call termination command may be input by the user from the user terminal device 200 or the second external device 300.

Meanwhile, a computer program product comprising a computer recording medium storing a computer program executable by a user terminal device 200 including a first communicator and a second communicator different from the first communicator, wherein the computer program performs an operation of determining whether a call request may be transmitted to the second external device 300 when the call request is received from a first external device 100 through the first communicator. As a result of the determination, if the call request may be transmitted, the computer program performs an operation of transmitting the call request to the second external device 300 through the second communicator. Thereafter, if a response for the call request is received from the second external device 300 through the second communicator, the computer program performs an operation of transmitting the response for the call request to the first external device 100 through the first communicator. Thereafter, if call data is received from the first external device through the first communicator, the computer program performs an operation of converting the call data into Internet Protocol (IP) data and transmitting the converted IP data to the second external device 300 through the second communicator.

Meanwhile, computer instructions for performing processing operations of the first external device 100, the user terminal device 200, or the second external device 300 according to the diverse embodiments of the disclosure described above may be stored in a non-transitory computer-readable medium. The computer instructions stored in the non-transitory computer-readable medium allow a specific device to perform the processing operations of the first external device 100, the user terminal device 200, or the second external device 300 according to the diverse embodiments of the disclosure described above when being executed by a processor of the specific device.

The non-transitory computer-readable medium is not a medium that stores data for a short time such as a register, a cache, a memory, or the like, but means a machine readable medium that semi-permanently stores data. Specifically, the non-transitory computer-readable medium may include a compact disk (CD), a digital versatile disk (DVD), a hard disk, a Blu-ray disk, a universal serial bus (USB), a memory card, a read only memory (ROM), or the like.

Although the embodiments of the disclosure are illustrated and described hereinabove, the disclosure is not limited to the abovementioned specific embodiments, but may be variously modified by those skilled in the art to which the disclosure pertains without departing from the scope and spirit of the disclosure claimed in the claims. These modifications should also be understood to fall within the scope of the disclosure.

The invention claimed is:

1. A user terminal device comprising:
a display;
a first communicator configured to communicate with a first external device;
a second communicator configured to communicate with a second external device; and
a processor configured to:
  determine whether a call request is transmitted to the second external device when the call request is received from the first external device, and transmit the received call request to the second external device through the second communicator when the call request is transmitted,
  transmit a response for the call request received from the second external device to the first external device through the first communicator, and
  convert call data into Internet Protocol (IP) data when the call data is received from the first external device, and transmit the converted IP data to the second external device through the second communicator,
wherein the same Voice over IP (VoIP) application as that being executing in the user terminal device is executing in the second external device, and the second external device has the same account of a VoIP application which is executing, as the user terminal device, and
wherein the processor is further configured to:
  determine whether the call request is transmitted to the second external device according to whether the VoIP application is executed, and
  transmit a call response for a phone call between the first external device and the user terminal device to the first external device through the first communicator, when the VoIP application is not executed.

2. The user terminal device as claimed in claim 1, wherein the processor is further configured to:
control the display to display a call user interface (UI) based on the response for the call request, and
control the display to display a first call UI corresponding to the call request, and change and display the first call UI to a second call UI while a call with the first external device is maintained based on the response.

3. The user terminal device as claimed in claim 2,
wherein the processor is further configured to control the display to change and display the second call UI to correspond to a third call UI displayed on the display of the second external device based on the response, and
wherein the third call UI corresponds to a VoIP call.

4. The user terminal device as claimed in claim 3,
wherein the first call UI comprises a first icon indicating network communication corresponding to the call request,
wherein the second call UI comprises the first icon and a second icon indicating the VoIP call, and
wherein the third call UI comprises the second icon.

5. The user terminal device as claimed in claim 1, further comprising:
a microphone; and
a speaker,
wherein the processor is further configured to control the microphone and the speaker to be disabled when the response for the call request is received from the second external device.

6. The user terminal device as claimed in claim 1,
wherein a number of second external devices is plural, and
wherein the processor is further configured to:
transmit the call request to a plurality of second external devices through the second communicator,
convert the call data received from the first external device into the IP data when a response for the call request is received from the plurality of second external devices, and
transmit the IP data to the plurality of second external devices through the second communicator.

7. The user terminal device as claimed in claim 1, wherein the processor is further configured to:
terminate a phone call by transmitting a call termination request to the second external device through the second communicator when the call termination request is received from the first external device, and
terminate the phone call by transmitting a call termination request to the first external device through the first communicator when the call termination request is received from the second external device.

8. The user terminal device as claimed in claim 1, wherein the processor is further configured to:
convert received IP data into call data when the IP data for phone call with the first external device is received from the second external device, and
transmit the converted call data to the first external device through the first communicator.

9. The user terminal device as claimed in claim 1,
wherein the first communicator transmits and receives call data for phone call with the first external device through a cellular network, and
wherein the second communicator transmits and receives IP data for the phone call with the second external device using an external server through a VOIP network.

10. A control method of a user terminal device, the control method comprising:
receiving a call request from a first external device through a first communicator;
determining whether the call request is transmitted to a second external device;
transmitting the call request to the second external device through a second communicator when the call request is transmitted;
transmitting a response for the call request to the first external device through the first communicator when the response for the call request is received from the second external device through the second communicator;
converting call data into Internet Protocol (IP) data when the call data is received from the first external device through the first communicator; and
transmitting the IP data to the second external device through the second communicator,
wherein the same Voice over IP (VoIP) application as that being executing in the user terminal device is executing in the second external device, and the second external device has the same account of a VoIP application which is executing, as the user terminal device, and
wherein the control method further comprises:
determining whether the call request is transmitted to the second external device according to whether the VoIP application is executed; and
transmitting a call response for a phone call between the first external device and the user terminal device to the first external device through the first communicator, when the VoIP application is not executed.

11. The control method as claimed in claim 10, further comprising displaying a call user interface (UI),
wherein the displaying of the call UI comprises:
displaying a first call UI corresponding to the call request; and
changing and displaying the first call UI to a second call UI while a call with the first external device is maintained based on the response for the call request.

12. The control method as claimed in claim 11,
wherein in the changing and displaying of the first call UI to the second call UI, the second call UI is changed and displayed to correspond to a third call UI displayed on a display of the second external device based on the response for the call request, and
wherein the third call UI corresponds to a VoIP call.

13. The control method as claimed in claim 12,
wherein the first call UI comprises a first icon indicating network communication corresponding to the call request,
wherein the second call UI comprises the first icon and a second icon indicating the VoIP call, and
wherein the third call UI comprises the second icon.

14. The control method as claimed in claim 10, further comprising disabling a microphone and a speaker of the user terminal device when the response for the call request is received.

15. The control method as claimed in claim 10,
wherein a number of second external devices is plural, and
wherein the control method further comprises:
transmitting the call request to a plurality of second external devices through the second communicator;
converting the call data received from the first external device into the IP data when a response for the call request is received from the plurality of second external devices; and
transmitting the IP data to the plurality of second external devices through the second communicator.

16. The control method as claimed in claim 10, wherein the control method further comprises:
terminating a phone call by transmitting a call termination request to the second external device through the second communicator when the call termination request is received from the first external device, and terminating the phone call by transmitting a call termination request to the first external device through the first communicator when the call termination request is received from the second external device.

17. The control method as claimed in claim 10, wherein the control method further comprises:

converting received IP data into call data when the IP data for phone call with the first external device is received from the second external device, and transmitting the converted call data to the first external device through the first communicator.

18. The control method as claimed in claim 10, wherein the first communicator transmits and receives call data for phone call with the first external device through a cellular network, and wherein the second communicator transmits and receives IP data for the phone call with the second external device using an external server through a VoIP network.

19. The control method as claimed in claim 10, wherein the call data is voice data.

\* \* \* \* \*